(12) United States Patent
Hamada et al.

(10) Patent No.: US 8,270,805 B2
(45) Date of Patent: *Sep. 18, 2012

(54) RECORDING/REPRODUCTION APPARATUS AND METHOD AS WELL AS RECORDING MEDIUM

(75) Inventors: Toshiya Hamada, Saitama (JP); Motoki Kato, Kanagawa (JP)

(73) Assignee: Sony Corporation, Tokyo (JP)

(*) Notice: Subject to any disclaimer, the term of this patent is extended or adjusted under 35 U.S.C. 154(b) by 999 days.

This patent is subject to a terminal disclaimer.

(21) Appl. No.: 12/140,318

(22) Filed: Jun. 17, 2008

(65) Prior Publication Data

US 2008/0253742 A1 Oct. 16, 2008

Related U.S. Application Data

(60) Continuation of application No. 11/231,774, filed on Sep. 22, 2005, now Pat. No. 7,403,698, which is a division of application No. 09/721,155, filed on Nov. 22, 2000, now Pat. No. 6,999,674.

(30) Foreign Application Priority Data

Nov. 24, 1999 (JP) .................................. 11-332352

(51) Int. Cl.
*H04N 9/80* (2006.01)
(52) U.S. Cl. .................................................... 386/241
(58) Field of Classification Search .................. None
See application file for complete search history.

(56) References Cited

U.S. PATENT DOCUMENTS

| | | | |
|---|---|---|---|
| 5,745,643 A | 4/1998 | Mishina | |
| 5,870,523 A | 2/1999 | Kikuchi et al. | |
| 5,966,352 A | 10/1999 | Sawabe et al. | |
| 6,148,140 A | 11/2000 | Okada et al. | |
| 6,453,119 B1 | 9/2002 | Maruyama et al. | |
| 6,484,233 B1 | 11/2002 | Fujinami et al. | |
| 7,403,698 B2 * | 7/2008 | Hamada et al. | 386/248 |

FOREIGN PATENT DOCUMENTS

| | | |
|---|---|---|
| JP | 9-65272 | 3/1997 |
| JP | 11-317014 | 11/1999 |
| WO | WO 00 00981 | 1/2000 |

OTHER PUBLICATIONS

R. Hedtke, et al., "Schnittbearbeitung Von MPEG-2-Codierten Videosequenzen" *Fernseh und Kinotechnik*, VDE Verlag GMBH, Berlin, DE, vol. 50, No. 7, Jul. 1, 1996, pp. 367-373, XP000623229, ISSN: 0015-0142.

European Search Report dated Mar. 14, 2012, in European Patent Application No. 08 01 3639 (in English).

European Supplemental Search Report dated Mar. 29, 2012, in European Patent Application No. 08 01 3639.3 (in English).

S. Merril Weiss, "Switching Facilities in MPEG-2: Necessary But Not Sufficient", SMPTE Journal, vol. 104, No. 12, Dec. 1, 1995, pp. 788-802, XP000543847 (in English).

Norm Hurst et al., "MPEG Splicing: A New Standard for Television—SMPTE 312M", SMPTE Journal, vol. 107, No. 11, Nov. 1, 1998, pp. 978-988, XP000804761 (in English).

* cited by examiner

*Primary Examiner* — Huy T Nguyen
(74) *Attorney, Agent, or Firm* — Oblon, Spivak, McClelland, Maier & Neustadt, L.L.P.

(57) ABSTRACT

The invention provides a recording/reproduction apparatus and method as well as a recording medium wherein, when nondestructive editing is executed for an AV signal, the AV signal can be reproduced seamlessly without suffering from any interruption. Information representative of states (an A type, a C type, a D type, or an E type) of an IN point and an OUT point on a Clip, designated by a Playitem, of a Playlist in which at least more than one Playitems are arranged in the order of reproduction is described in a block Playitem( ).

9 Claims, 26 Drawing Sheets

F I G. 3
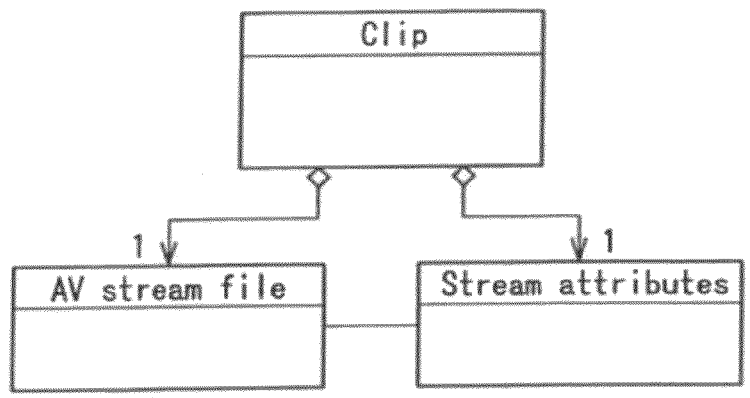
F I G. 4
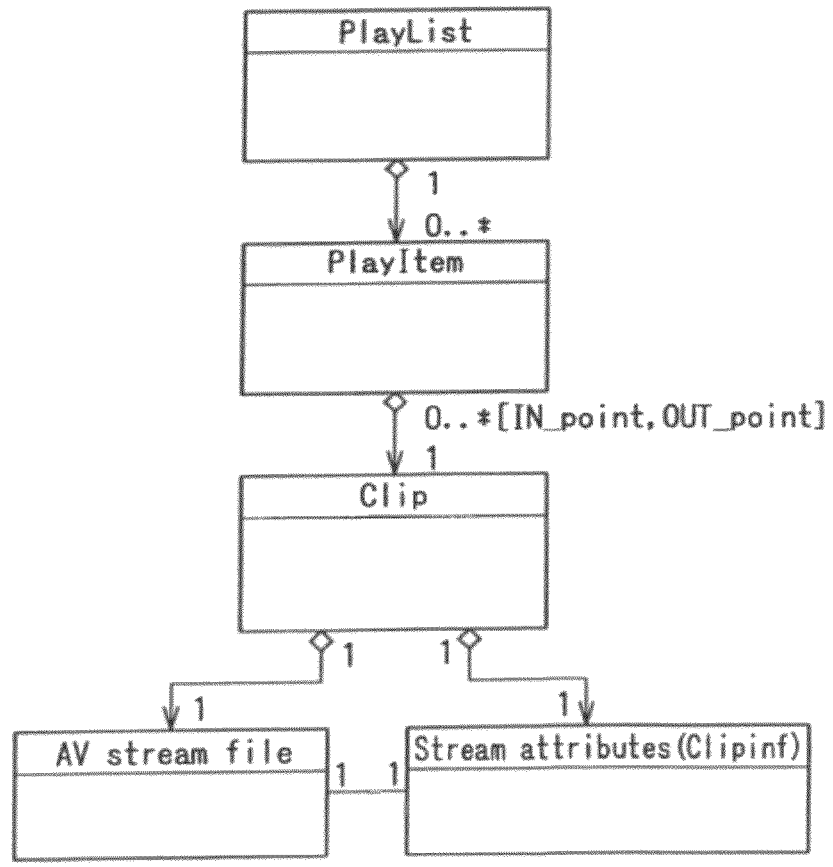

FIG. 5

```
/parent--/DVR
         |
         -info.dvr
         |
         -/PLAYLIST
         |        |
         |        -playlist000.plst
         |        |
         |        -playlist001.plst
         |        |
         |        -playlist002.plst
         |        |
         |        :
         |        -playlist###.plst
         |
         |
         --/CLIPINF
         |        |
         |        -001.clpi
         |        |
         |        -002.clpi
         |        |
         |        -003.clpi
         |        |
         |        :
         |        -%%%%.clpi
         |
         --/AVSTREAM
                  |
                  -0001.mpg
                  |
                  -0002.mpg
                  |
                  -0003.mpg
                  |
                  :
                  -%%%%.mpg
                  |
                  :
```

FIG. 6

| syntax info.dvr( | size | type |
|---|---|---|
| DVRVolume_start_address | 32 | bslbf |
| PlayListBlock_start_address | 32 | bslbf |
| ClipList_start_address | 32 | bslbf |
| MultiVolume_start_adess | 32 | bslbf |
| reserved | 64 | bslbf |
| for(i=0;i<L1;i++){ | | |
| padding_byte | 8 | bslbf |
| } | | |
| DVRVolume() | | |
| for(i=0;i<L2;i++){ | | |
| padding_byte | 8 | bslbf |
| } | | |
| PlayListBlock() | | |
| for(i=0;i<L3;i++){ | | |
| padding_byte | 8 | bslbf |
| } | | |
| ClipList() | | |
| for(i=0;i<L4;i++){ | | |
| padding_byte | 8 | bslbf |
| } | | |
| MultiVolume() | | |
| for(i=0;i<L5;i++){ | | |
| padding_byte | 8 | bslbf |
| } | | |
| } | | |

FIG.7

| syntax | size | type |
|---|---|---|
| %%%%.clpi( | | |
| ClipInfo_start_address | 32 | bslbf |
| SequenceInfo_start_address | 32 | bslbf |
| CPI_start_address | 32 | bslbf |
| MarkList_start_address | 32 | bslbf |
| reserved | 64 | bslbf |
| for(i=0;i<L1;i++){ | | |
| padding_byte | 8 | bslbf |
| } | | |
| ClipInfo() | | |
| for(i=0;i<L2;i++){ | | |
| padding_byte | 8 | bslbf |
| } | | |
| SequenceInfo() | | |
| for(i=0;i<L3;i++){ | | |
| padding_byte | 8 | bslbf |
| } | | |
| CPI() | | |
| for(i=0;i<L4;i++){ | | |
| padding_byte | 8 | bslbf |
| } | | |
| MarkList() | | |
| for(i=0;i<L5;i++){ | | |
| padding_byte | 8 | bslbf |
| } | | |
| } | | |

FIG. 8

| syntax | size | type |
|---|---|---|
| playlist###.plst( | | |
| PlayList_start_address | 32 | bslbf |
| reserved | 160 | bslbf |
| for(i=0;i<L1;i++){ | | |
| padding_byte | 8 | bslbf |
| } | | |
| PlayList() | | |
| for(i=0;i<L2;i++){ | | |
| padding_byte | 8 | bslbf |
| } | | |
| } | | |

FIG. 9

| Syntax | size | type |
|---|---|---|
| PlayList() { | | |
|   version_number | 8*8 | char |
|   length | 32 | bslbf |
|   reserved | 14 | bslbf |
|   aux_audio_valid_flag | 2 | bslbf |
|   reserved | 8 | uimsbf |
|   playlist_type | 16 | uimsbf |
|   playlist_name_length | 8 | uimsbf |
|   for(i=0;i<L1;i++) { | | |
|     char | 8 | bslbf |
|   } | | |
|   ResumeInfo() | | |
|   synchronous_start_pts | 32 | bslbf |
|   num_of_playitems_for_main //main path | 16 | uimsbf |
|   num_of_playitems_for_aux_audio //aux audio path | 16 | uimsbf |
|   for(i=0;i<num_of_playitems_for_main;i++) { | | |
|     PlayItem() //main path | | |
|   } | | |
|   for(i=0;i<num_of_playitems_for_aux_audio;i++) { | | |
|     PlayItem() //aux audio path | | |
|   } | | |
|   PlaylistInfoDescriptor() | | |
| } | | |

FIG. 10

| Syntax | size | type |
|---|---|---|
| PlayItem() { | | |
|   file_name_length | 8 | uimsbf |
|   for(i=0;i<L1;i++) { | | |
|     char | 8 | bslbf |
|   } | | |
|   program_number | 16 | uimsbf |
|   sequence_id | 8 | uimsbf |
|   playitem_name_length | 8 | bslbf |
|   for(i=0;i<L2;i++) { | | |
|     char | 8 | bslbf |
|   } | | |
|   reserved | 4 | bslbf |
|   condition_IN | 2 | bslbf |
|   condition_OUT | 2 | bslbf |
|   if(condition_IN!=0x03) { | | |
|     playitem_start_time_stamp | 32 | bslbf |
|   } else { | | |
|     reserved | 32 | bslbf |
|   } | | |
|   if(condition_OUT!=0x03) { | | |
|     playitem_end_time_stamp | 32 | bslbf |
|   } else { | | |
|     reserved | 32 | bslbf |
|   } | | |
| } | | |

FIG. 15
CHARACTERISTICS
NONDESTRUCTIVE EDITING WHEREIN
THE ORIGINAL IS NOT DESTROYED
THE FREE CAPACITY DOES NOT INCREASE
SEAMLESS REPRODUCTION IS POSSIBLE
WITH A BRIDGE SEQUENCE
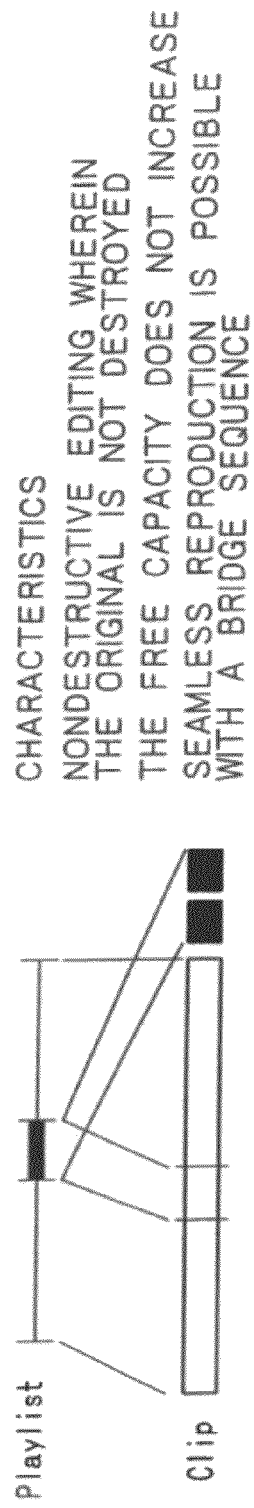
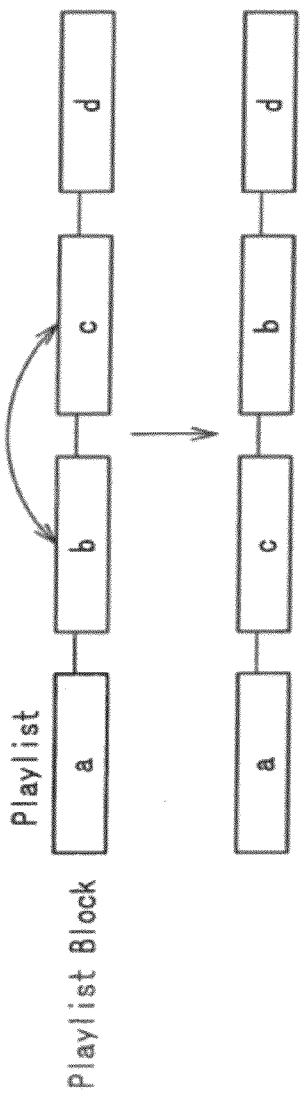
FIG. 16

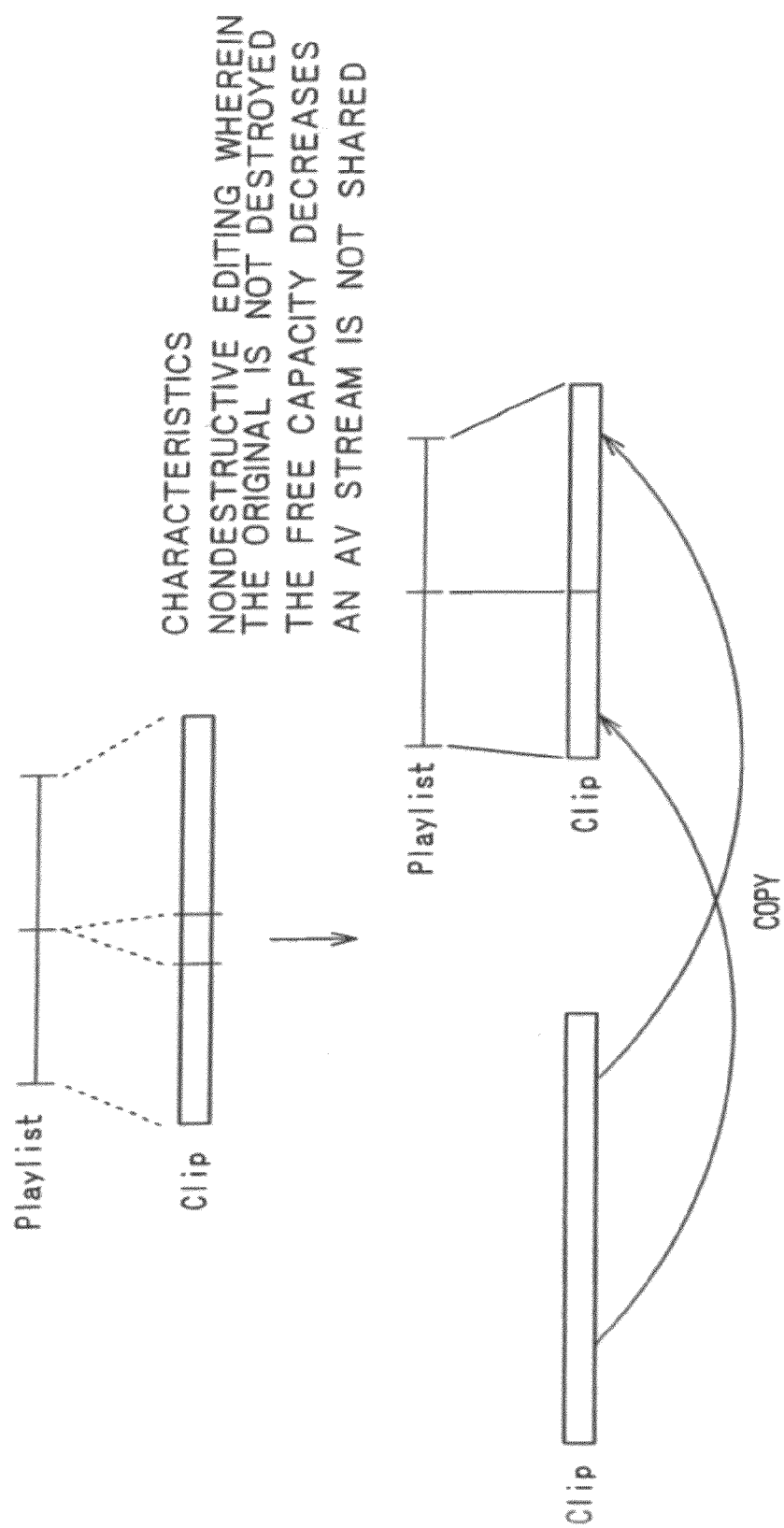

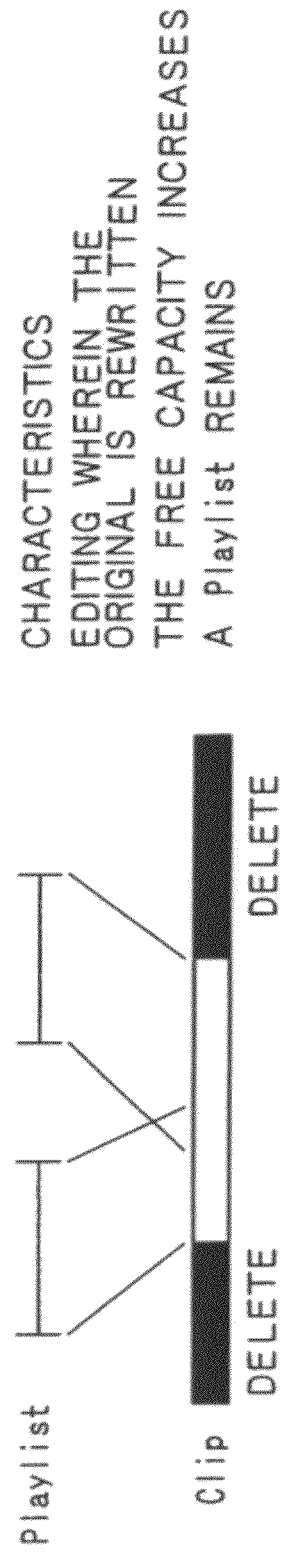

F I G. 19

| condition_IN_OUT | Meaning |
|---|---|
| 0x00 | A TYPE. (SINCE A playitem STARTS AND ENDS AT ARBITRARY BYTE POSITIONS, THE PICTURE QUALITY BETWEEN playitems IS NOT ASSURED.) |
| 0x01 | C TYPE. clean break (THIS REPRESENTS THAT SUCH A TAIL PROCESS AS REMOVES DATA WHICH ARE NOT REQUIRED FOR DECODING HAS BEEN PERFORMED.) |
| 0x02 | D TYPE. continuous (AN INTERMEDIATE POINT OF AN AV STREAM FILE IS DESIGNATED AND THE BIT STREAM IS CONTINUOUS TO PRECEDING AND FOLLOWING playitems IN THE ACCURACY OF A BYTE. THEREFORE, CONTINUOUS DECODING IS POSSIBLE IF THE BIT STREAM IS READ IN ACCORDANCE WITH THE ADDRESS. THE POINT APPEARS WHEN THE REPRODUCTION POINT GOES OUT FROM INTERMEDIATELY OF A FILE AND ENTERS A BRIDGE SEQUENCE, WHEN THE REPRODUCTION POINT GOES OUT OF A BRIDGE SEQUENCE AND ENTERS AN INTERMEDIATE PORTION OF A FILE, AND SO FORTH.) |
| 0x03 | E TYPE. (THE TOP OR THE LAST OF AN AV STREAM FILE IS DESIGNATED, AND THE BIT STREAM IS CONTINUOUS TO THE PRECEDING OR FOLLWING playitem IN THE ACCURACY OF A BYTE. THE CONNECTION POINT APPEARS WHEN A CONTINUOUS STREAM IS DIVIDED INTO TWO FILES, AND SO FORTH.) |
| 0x04~0xff | reserved |

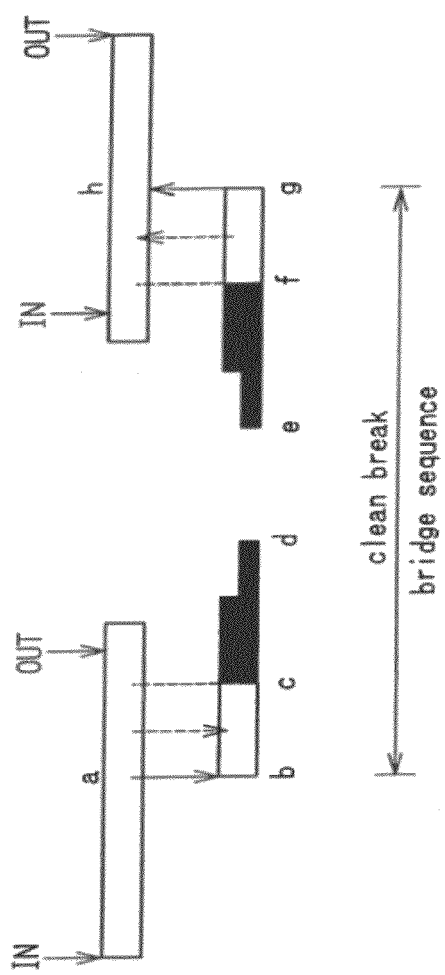
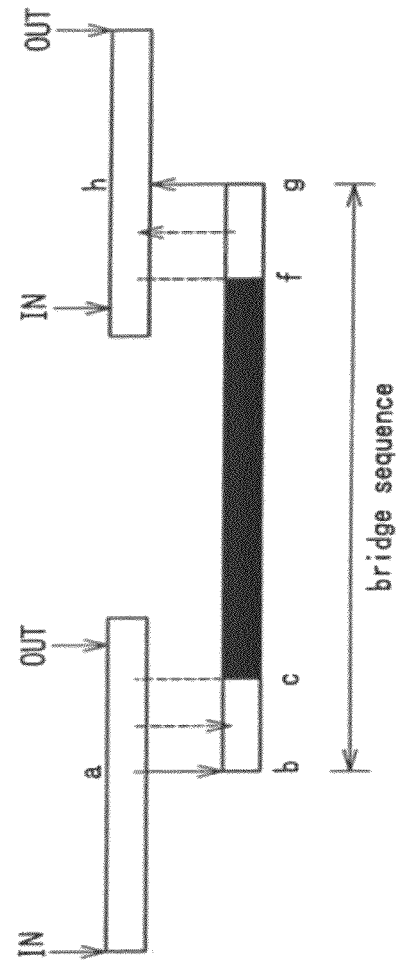
F I G. 21A
F I G. 21B

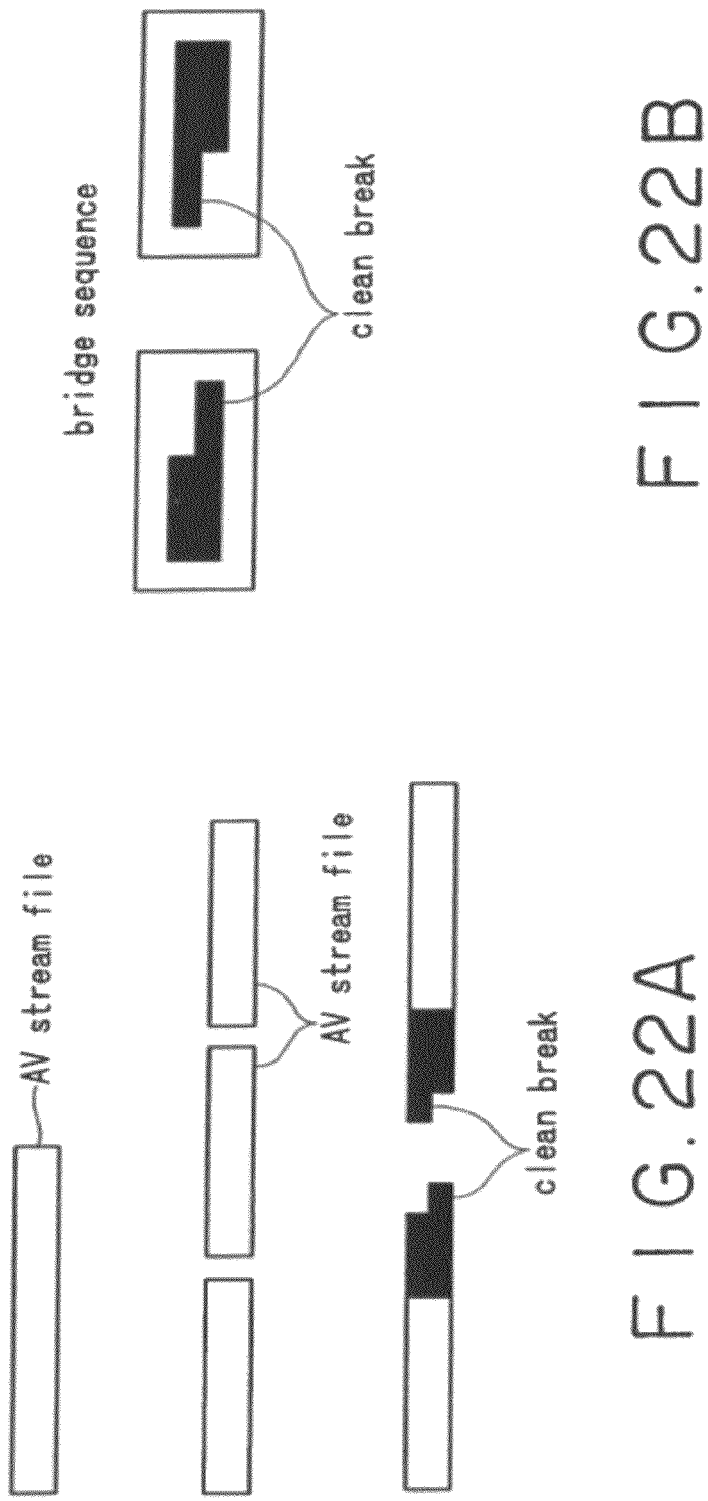

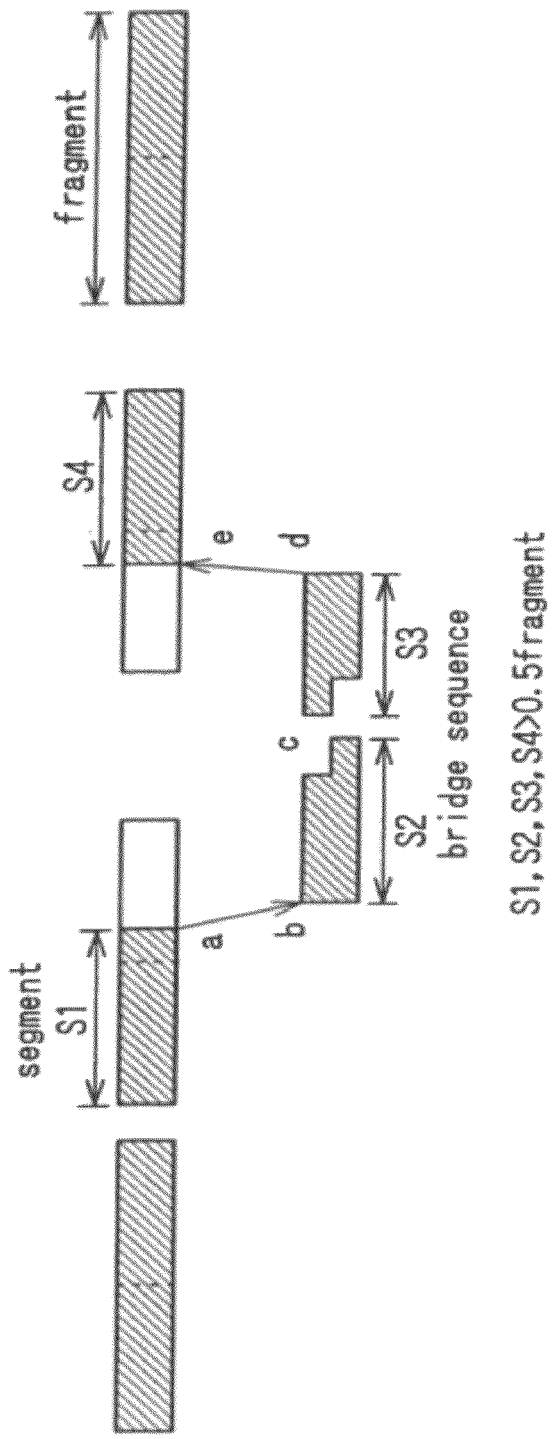

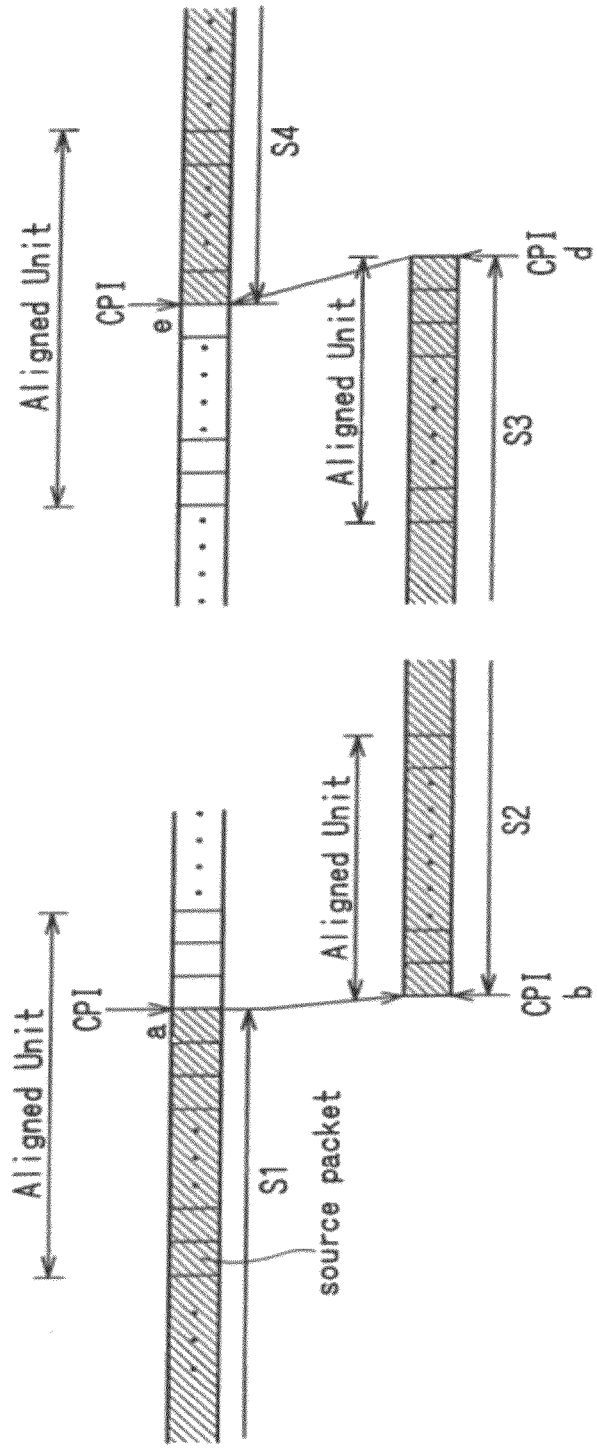
F I G. 25A  F I G. 25B

RECORDING/REPRODUCTION APPARATUS AND METHOD AS WELL AS RECORDING MEDIUM

CROSS-REFERENCE TO RELATED APPLICATIONS

The present application is a continuation of and claims the benefit of priority under 35 USC §120 from U.S. Ser. No. 11/231,774 filed on Sep. 22, 2005, the entire contents of which are herein incorporated by reference. U.S. Ser. No. 11/231,774 is in turn a divisional of and claims the benefit of priority under 35 USC §120 from U.S. Ser. No. 09/721,155, filed on Nov. 22, 2000, which issued as U.S. Pat. No. 6,999,674 on Feb. 14, 2006, and is also based upon and claims the benefit of priority under 35 USC §119 from the Japanese Patent Application No. JP 11-332352, filed on Nov. 24, 1999.

BACKGROUND OF THE INVENTION

This invention relates to a recording/reproduction apparatus and method as well as a recording medium, and more particularly to a recording/reproduction apparatus and method as well as a recording medium suitable for use to seamlessly reproduce discontinuous AV data read out by random accessing.

In recent years, a DVD-RAM (Digital Versatile Disk-Random Access Memory) and so forth have been developed as a medium onto and from which data can be recorded and reproduced. Such large capacity media as a DVD-RAM are expected very much as media onto which a digital AV (Audio Visual) signal such as a video signal is to be recorded.

As a supply source of a digital AV signal to be recorded onto a DVD-RAM or the like, an AV signal recorded on a VHS cassette tape, an 8-mm tape and so forth which are existing recording media, an AV signal as a broadcasting signal of digital satellite broadcasting, digital ground wave broadcasting, digital cable television broadcasting or the like, or a like AV signal is available.

A digital video signal supplied from any source described above is normally in a form compressed and coded in accordance with the MPEG (Moving Picture Experts Group) 2 system. Accordingly, when a digital video signal supplied from any source is recorded onto a DVD-RAM or the like, an AV signal compressed and coded in accordance with the MPEG2 system must be decoded once and then encoded in accordance with the MPEG2 system and recorded onto the optical disk. However, where an AV signal in a compressed and coded state is decoded and encoded again in this manner, the quality of the AV signal is deteriorated significantly.

Therefore, in order to minimize the deterioration of the quality of an AV signal, it is investigated to record an AV signal in a compressed and coded state supplied from any source in the form of a bit stream as supplied onto a DVD-RAM or the like without encoding and decoding the AV signal. In other words, it is investigated to use a DVD-RAM or the like as a data streamer.

A disk medium such as a DVD-RAM allows high speed random accessing thereto. Thus, it is convenient if this fact can be utilized to reproduce a bit stream recorded on a DVD-RAM or the like in an order different from the order in which it is recorded. To designate a reproduction order is a kind of editing, and designation of a reproduction order is performed without any change in arrangement of the bit stream recorded on the disk. In the following, such editing as just described is described as nondestructive editing.

However, since the arrangement of a bit stream on a disk medium is not necessarily in an optimized state for nondestructive editing, there is a subject that, when nondestructive editing is actually executed, the AV signal is interrupted at a changeover point of the bit stream and so forth.

SUMMARY OF THE INVENTION

It is an object of the present invention to provide a recording/reproduction apparatus and method as well as a recording medium wherein, when nondestructive editing is executed for an AV signal, the AV signal can be reproduced without suffering from any interruption.

In order to attain the object described above, according to an aspect of the present invention, there is provided a recording/reproduction apparatus for recording or reproducing AV data onto or from a recording medium, comprising AV data file recording means for recording an AV data file obtained by converting the AV data into a file onto the recording medium, production means for producing reproduction range information representative of a range of reproduction of the AV data file, classification means for classifying a state of at least one end of the range of reproduction, addition means for adding information representative of a result of the classification of the classification means to the reproduction range information, preparation means for arranging at least more than one piece of the reproduction range information in order for reproduction to prepare a reproduction list, and reproduction list recording means for recording the reproduction list onto the recording medium.

The classification means may classify the state of at least one end of the reproduction range into one of four types.

The recording/reproduction apparatus may further comprise formation means for forming a bridge sequence in response to a result of the classification of the classification means.

According to another aspect of the present invention, there is provided a recording/reproduction method for a recording/reproduction apparatus for recording or reproducing AV data onto or from a recording medium, comprising an AV data file recording step of recording an AV data file obtained by converting the AV data into a file onto the recording medium, a production step of producing reproduction range information representative of a range of reproduction of the AV data file, a classification step of classifying a state of at least one end of the range of reproduction, an addition step of adding information representative of a result of the classification by the processing in the classification step to the reproduction range information, a preparation step of arranging at least more than one piece of the reproduction range information in order for reproduction to prepare a reproduction list, and a reproduction list recording step of recording the reproduction list onto the recording medium.

According to a further aspect of the present invention, there is provided a recording medium on which a computer-readable program for recording or reproducing AV data onto or from an information recording medium is recorded, the program comprising an AV data file recording step of recording an AV data file obtained by converting the AV data into a file onto the information recording medium, a production step of producing reproduction range information representative of a range of reproduction of the AV data file, a classification step of classifying a state of at least one end of the range of reproduction, an addition step of adding information representative of a result of the classification by the processing in the classification step to the reproduction range information, a preparation step of arranging at least more than one piece of the reproduction range information in order for reproduction to prepare a reproduction list, and a reproduction list recording step of recording the reproduction list onto the information recording medium.

In the recording/reproduction apparatus, the recording/reproduction method and the program of the recording medium, an AV data file obtained by converting AV data into a file is recorded, and reproduction range information representative of a range of reproduction of the AV data file is produced. Further, the state of at least one end of the range of reproduction is classified, and information representative of a result of the classification is added to the reproduction range information. Further, a reproduction list in which at least more than one piece of reproduction range information are arranged in the order in which they are to be reproduced is prepared, and the reproduction list is recorded onto the recording medium. Consequently, the AV data can be recorded in such a manner that, when nondestructive editing is executed, the AV signal can be reproduced without interruption.

According to a still further aspect of the present invention, there is provided a recording/reproduction apparatus for recording or reproducing AV data onto or from a recording medium, comprising readout means for reading out a reproduction list recorded on the recording medium, extraction means for extracting information representative of a state of at least one end of a range of reproduction from among at least more than one piece of reproduction range information which forms the reproduction list, and reproduction means for reproducing the AV data recorded on the recording medium based on the information representative of the state of the at least one end of the range of reproduction extracted by the extraction means.

According to a yet further aspect of the present invention, there is provided a recording/reproduction method for a recording/reproduction apparatus for recording or reproducing AV data onto or from a recording medium, comprising a readout step of reading out a reproduction list recorded on the recording medium, an extraction step of extracting information representative of a state of at least one end of a range of reproduction from among at least more than one piece of reproduction range information which forms the reproduction list, and a reproduction step of reproducing the AV data recorded on the recording medium based on the information representative of the state of the at least one end of the range of reproduction extracted by the processing in the extraction step.

According to a yet further aspect of the present invention, there is provided a recording medium on which a computer-readable program for recording or reproducing AV data onto or from an information recording medium is recorded, the program comprising a readout step of reading out a reproduction list recorded on the information recording medium, an extraction step of extracting information representative of a state of at least one end of a range of reproduction from among at least more than one piece of reproduction range information which forms the reproduction list, and a reproduction step of reproducing the AV data recorded on the information recording medium based on the information representative of the state of the at least one end of the range of reproduction extracted by the processing in the extraction step.

In the recording/reproduction apparatus, the recording/reproduction method and the program of the recording medium, a reproduction list recorded is read out, and from within at least more than one piece of reproduction range information which forms the reproduction list, the information representative of the state of at least one end of the extracted reproduction range is extracted, and AV data recorded on the recording medium are reproduced based on the extracted information representative of the state of at least one end of the reproduction range. Consequently, when nondestructive editing is executed, the AV signal can be reproduced without interruption.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 3 is a flow diagram showing a construction of the Clip;

FIG. 4 is a diagram showing a structure for managing an AV stream;

FIG. 5 is a view showing a directory structure of data stored on an optical disc;

FIG. 6 is a table illustrating the syntax of a file info.dvr;

FIG. 7 is a table illustrating the syntax of a file %%%%.clpi;

FIG. 8 is table illustrating syntax of a file Playlist###.plst;

FIG. 9 is a table illustrating the syntax of a block Playlist( );

FIG. 10 is a table illustrating the syntax of a block Playitem( );

FIG. 15 is a diagrammatic view illustrating an example of seamless connection using a bridge sequence;

FIG. 16 is a block diagram illustrating movement of a Playlist;

FIG. 17 is a diagrammatic view illustrating an example of Clip conversion;

FIG. 18 is a diagrammatic view illustrating an example of minimization of a Clip;

FIG. 19 is a table illustrating types of a connection point between Playitems;

FIGS. 21A and 21B are diagrammatic views illustrating different relationships of a bridge sequence and a clean break;

FIGS. 22A and 22B are diagrammatic views illustrating different relationships between a clean break and a bridge sequence;

FIGS. 23 to 26B are diagrammatic views illustrating different examples of the state of a bridge sequence;

DETAILED DESCRIPTION OF THE PREFERRED EMBODIMENT

Figure 1:
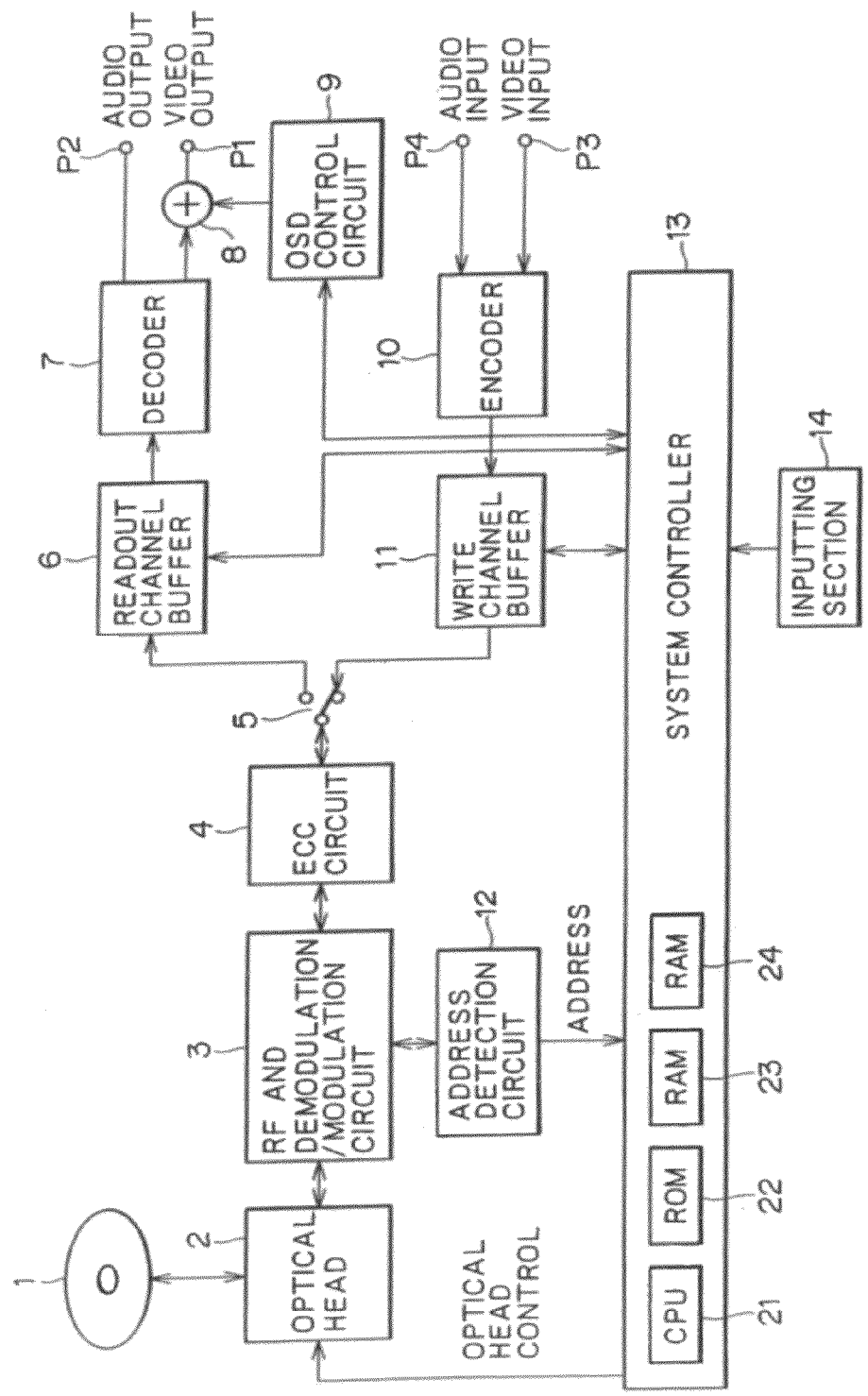
FIG. 1 is a block diagram showing a construction of an optical disc apparatus to which the present invention is applied.

FIG. 1 shows an example of a construction of an optical disk apparatus to which the present invention is applied. Referring to FIG. 1, the present optical disk apparatus compresses, codes and multiplexes an AV signal inputted thereto, for example, in accordance with the MPEG system or the like, records an AV stream file obtained by converting the AV signal into a file onto an optical disk 1 such as a DVD-RAM, and reproduces an AV signal from the optical disk 1 on which AV stream files are recorded. In the present optical disk apparatus, a single optical head 2 is provided for the one rewritable optical disk 1, and the optical head 2 is used for both of reading out and writing of data.

A bit stream read out from the optical disk 1 by the optical head 2 is demodulated by an RF and demodulation/modulation circuit 3, and error correction is performed for the demodulated bit stream by an ECC circuit 4. Then, the bit stream from the ECC circuit 4 is sent through a switch 5 to a readout channel buffer 6 for absorbing a difference between the readout rate and a decoding processing rate. An output of the readout channel buffer 6 is supplied to a decoder 7. The readout channel buffer 6 is formed such that writing into and reading out from the readout channel buffer 6 can be controlled by a system controller 13.

The bit stream outputted from the readout channel buffer 6 is decoded by the decoder 7, and a video signal and an audio signal are outputted from the decoder 7. The video signal outputted from the decoder 7 is inputted to a synthesis circuit 8, by which it is synthesized with a video signal outputted from an OSD (On Screen Display) control circuit 9. The synthesized signal from the synthesis circuit 8 is outputted from an output terminal P1 to a display unit not shown so that it is displayed on the display unit. The audio signal outputted from the decoder 7 is sent from another output terminal P2 to and reproduced by a speaker not shown.

On the other hand, a video signal inputted from an input terminal P3 and an audio signal inputted from another input terminal P4 are encoded by an encoder 10 and then sent to a write channel buffer 11 for absorbing the encoding processing rate and a writing rate. Also the write channel buffer 11 is constructed such that reading and writing control from and into the write channel buffer 11 can be performed by the system controller 13.

Data stored in the write channel buffer 11 are read out from the write channel buffer 11 and inputted through the switch 5 to the ECC circuit 4, by which error correction codes are added to the data. Then, the data from the ECC circuit 4 are modulated by the RF and demodulation/modulation circuit 3. A signal (RF signal) outputted from the RF and demodulation/modulation circuit 3 is written onto the optical disk 1 by the optical head 2.

An address detection circuit 12 detects address information of a track of the optical disk 1 to be recorded or read out. The system controller 13 controls operation of the components of the optical disk apparatus, and includes a CPU 21 for performing various controls, a ROM 22 in which processing programs to be executed by the CPU 21 and so forth are stored, a RAM 23 for temporarily storing data and so forth produced in a processing procedure, and a RAM 24 for storing various information files to be recorded onto or reproduced from the optical disk 1. The CPU 21 finely adjusts the position of the optical head 2 based on a result of detection of the address detection circuit 12. The CPU 21 further performs switching control of the switch 5. An inputting section 14 including various switches, buttons and so forth is operated by a user in order to input various instructions.

Subsequently, a scheme of nondestructive editing wherein some ranges or the entire range of an AV stream file recorded on the optical disk 1 is designated and the thus designated ranges are reproduced successively is described.

Figure 2:
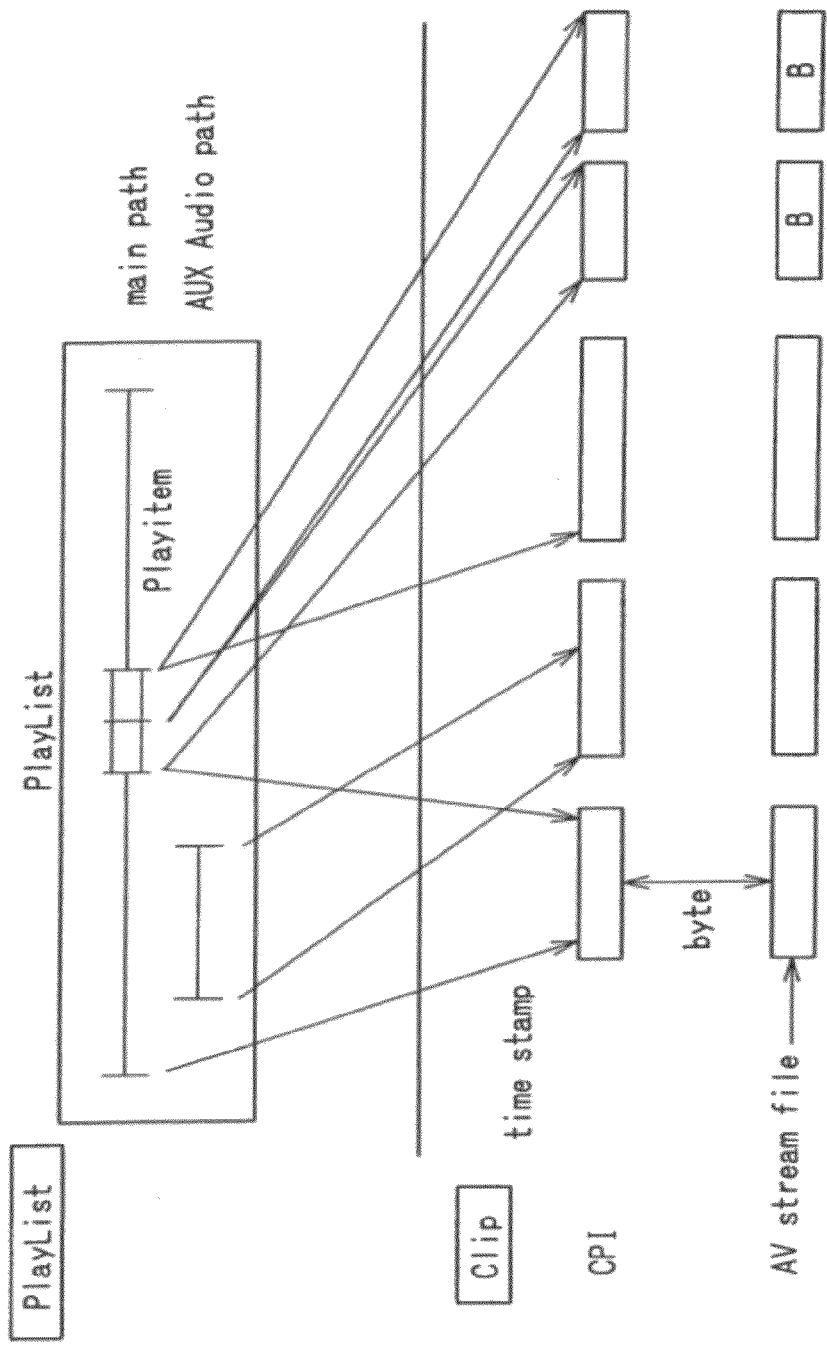
FIG. 2 is a diagrammatic view illustrating a relationship of a Clip and a Playlist.

FIG. 2 illustrates a file Playlist in which an order for reproduction in nondestructive editing is described. The Playlist is a unit designated by a user and corresponding to one or more streams to be reproduced successively. A Playlist of the simplest construction is obtained if it is designated that the range of a certain one stream from its recording start position to its recording end position should be reproduced.

The Playlist is composed of information which designates an AV stream and information representative of a reproduction start point (IN point) and a reproduction end point (OUT point) in the AV stream. A set of information which designates an AV stream and information representative of a start point and an end point of the AV stream is collectively referred to as Playitem. In other words, a Playlist is composed of one or more Playitems.

If a Playitem is reproduced, then the range from the IN point and the OUT point of a specified AV stream is reproduced.

An AV stream is a bit stream multiplexed in the form of a transport stream or the like prescribed by the MPEG2, and if information relating to the AV stream is stored as a file (hereinafter referred to as AV stream information file) separate from an AV stream obtained by converting the AV stream into a file, then reproduction and editing are facilitated further. An AV stream file and an AV stream information file are regarded as an object as a unit of information and is called Clip. In particular, as seen in FIG. 3, the Clip is an object composed of an AV stream file and an AV stream information file (indicated as Stream attributes in FIG. 3) which correspond in a one-by-one corresponding relationship to each other.

As seen in FIG. 4, a Playlist, a Playitem and a Clip are provided hierarchically to allow nondestructive editing.

Here, attention is paid to connection points between Playitems. While two Playitems individually refer to different Clips, a transport stream (AV stream) read in from the optical disk 1 sometimes becomes discontinuous at connection points between the Playitems. The factor of such discontinuity is provided by discontinuity of the syntax in the transport stream or by discontinuity of supply from two files.

If discontinuity is present at a connection point of a Playitem, then such deterioration of the reproduction quality that an image reproduced becomes a still picture or an image or sound is interrupted occurs. However, if the factor of the discontinuity at the connection point of the Playitem is known in advance before the connection point of the Playitem is reproduced, then the deterioration of the reproduction quality at the connection point can be suppressed.

If discontinuity in supply from two files is present at a connection point at a Playitem, then the lowest readout rate of the file should be assured. In other words, a countermeasure should be taken to prevent the readout channel buffer 6, which stores a read out AV stream before it is decoded, from underflowing.

Here, the reproduction system of the optical disk apparatus of FIG. 1 is examined in a simplified form which merely includes the optical disk 1, readout channel buffer 6 and decoder 7. Since data cannot be read from the optical disk 1 during random accessing, in order to prevent the readout channel buffer 6 from underflowing, it is necessary to store a certain amount of data in the readout channel buffer 6 immediately before track jumping within which reading of data is impossible is performed. Such control can be realized by handling a sector, which is a storage area on the optical disk 1, as blocks.

For example, a set of adjacent sectors which can be read out continuously without track jumping is considered and is called fragment. The rule that a fragment always includes more than a fixed rate of data is provided. The rule that, for example, the rate of data which occupy in each fragment is always higher than one half the size of one fragment. In other words, where an area occupied by data in a fragment is called segment, the condition that the magnitude of a segment is greater than one half a fragment is set. Such a fixed rate is determined taking the time required for jumping from a fragment which is present at an arbitrary position on the optical disk 1 to another fragment which is present at another arbitrary position, the size of the fragment, the burst readout rate and so forth into consideration.

If the construction described above is employed, then where jumping upon random accessing is performed in a unit of a fragment, since some amount of data is present in each fragment, jumping between fragments can be performed in a state wherein a sufficient amount of data is present in the readout channel buffer 6. In other words, it is possible to supply data to the decoder 7 while assuring the lowest rate.

Now, a case wherein discontinuity is present in the syntax of a transport stream is considered. Usually, even if two bit streams MPEG encoded and multiplexed separately from each other are individually cut in a unit of a transport packet and cut faces of the different bit streams are joined together, a stream of the correct syntax as prescribed in the MPEG systems is not obtained. Further, since different transport streams are different also in a PCR (Program Clock Reference) which is a reference to the time base included in a transport stream, when decoding is to be performed across the connection points of them, such processing as to re-set the time base based on a new PCR is required.

Accordingly, even if information of whether or not discontinuity of the syntax is present at a connection point of a Playitem and information of the type of the discontinuity are known when decoding is to be decoded, they cannot be used in time. Therefore, the optical disk apparatus of the present invention is constructed such that it can supply information of whether or not discontinuity of the syntax is present at a connection point of a Playitem and information of the type of the discontinuity to the decoder 7 in advance.

Here, arrangement of files written on the optical disk 1 (which may be hereinafter referred to simply as disk) is described. The following four kinds of files are recorded on the disk as seen in FIG. 5.

info.dvr
playlist###.plst
%%%%.clpi
%%%%.mpg

A directory /DVR is provided on the disk, and the directory /DVR and so forth make a range managed by the optical disk apparatus. However, the directory /DVR may be a root directory of the disk or may be present under another arbitrary directory.

The file info.dvr is disposed in the directory /DVR. Further, a directory /PLAYLIST, another directory /CLIPINF and a further directory /AVSTREAM are disposed below the directory /DVR.

The files playlist###.plst are disposed below the directory /PLAYLIST. The files %%%%.clpi are disposed below the directory /CLIPINF. The files %%%%.mpg are disposed below the directory /AVSTREAM.

FIG. 6 illustrates a structure of the file info.dvr disposed only one under the directory /DVR. The file info.dvr has blocks formed individually for different kinds of information classified for individual functions. Information regarding the volume is placed in a block DVRVolume( ). Information regarding the arrangement of Playlists is placed in another block PlayListBlock( ). Information regarding the arrangement of Clips is placed in a further block ClipList( ). Information for linking a plurality of volumes with each other is placed in a still further block MultiVolume( ).

Addresses at which the tops of the blocks are recorded are described at a top portion of the file info.dvr. In particular, DVRVolume_start_address represents the position at which the block DVRVolume( ) starts in an intra-file relative byte number. PlayListBlock_start_address represents the position at which the block PlayListBlock( ) starts in an intra-file relative byte number. ClipList_start_address represents the position at which the block ClipList( ) starts in an intra-file relative byte number. MultiVolume_start_address represents the position at which the block MultiVolume( ) starts in an intra-file relative byte number.

The files %%%%.clpi below the directory /CLIPINF are produced in a one-by-one corresponding relationship to AV stream files %%%%.mpg below the directory /AVSTREAM. FIG. 7 illustrates a structure of a file %%%%.clpi. Also the file %%%%.clpi has blocks formed for individual kinds of information classified for individual functions.

Information regarding a Clip is placed in the block ClipInfo( ). Information regarding a discontinuity point (where attention is paid to a continuous range delimited by discontinuity points, it is called also continuous section) is placed in the block SequenceInfo( ). Information regarding CPI (Characteristic Point Information) representative of a characteristic point which can be randomly accessed in an AV stream is placed in the block CPI( ). Information of an index point for a head search applied to a Clip or start and end points of a commercial is placed in the block MarkList( ). Addresses representative of the tops of the individual blocks are described in a top portion of the file %%%%.clpi.

The files playlist###.plst below the directory /PLAYLIST are produced by one for each playlist. FIG. 8 shows a structure of a file playlist###.plst. The file playlist###.plst has a block Playlist( ) in which information regarding the playlist is placed, and an address (Playlist_start_address) representative of the top of the block Playlist( ) is described at a top portion of the file playlist###.plst. Consequently, it is possible to insert a padding_byte before or after the block Playlist( ).

FIG. 9 shows a structure of the block PlayList( ). The version_number represents a version number of information described in the following portion. The aux_audio_valid_flag represents whether or not the PlayList has audio for post-recording. When the aux_audio_valid_flag represents "No", the Playitem( ) for the aux_audio is ignored and is not reproduced.

The playlist_type represents a type of the playlist. The playlist_name_length represents a data length of the name of the playlist. A character string representative of the name is described by a for sentence immediately following the playlist_name_length. The Resumeinfo( ) is a region into which, when reproduction of the PlayList is ended intermediately, information representative of the position at which the reproduction is interrupted is placed. The synchronous_start_pts represents, where an effective aux_audio_path is present, a start time of the aux_audio_path. The synchronous_start_pts is used to realize synchronous reproduction between a main path and an aux audio path. The num_of_playitems_for_main represents the number of Playitems which form a main path. The num_of_playitems_for_aux_audio represents the number of Playitems which form the aux_audio path. The PlaylistInfoDescriptor( ) is a region for placing information, explanation of contents and so forth relating to the PlayList, and information relating to the PlayList is described by a for sentence.

FIG. 10 shows a structure of the block Playitem( ). The file_name_length represents a data length of a file name of a Clip information file (a file whose extension is clpi) which is referred to by the Playitem, and a character string of the file name is placed in a for sentence immediately following the file_name_length. The program_number represents a program_number which specifies a program referred to by the Playitem (the program denotes a collection of elementary streams of video, audio and other data as defined by the MPEG systems).

The sequence_id represents a section of a range of time within which the PCR is continuous. Since a consistent continuous time base can be defined in the section, a start point and an end point of the Playitem can be defined uniquely. In other words, the start point and the end point of each Playitem must be present in the same sequence. The playitem_name_length represents the data length of the name of the playitem, and a character string of the name is placed in a for sentence immediately following the playitem_name_length. The condition_IN represents a condition of AV stream data which corresponds to a start portion of the Playitem. The condition_OUT represents a condition of AV stream data which corresponds to an end portion of the Playitem. Details of the conditions are hereinafter described with reference to FIG. 19.

The playitem_start_time_stamp represents a pts (presentation time stamp) at the start point of the Playitem. However, when the condition_IN is 0x03, since the AV stream file is read in and decoded up to the last end thereof, the playitem_start_time_stamp is unnecessary. The playitem_end_time_stamp represents a pts at the end portion of the Playitem. However, when the condition_OUT is 0x03, since the AV stream file is read in and decoded beginning with the top thereof, the playitem_end_time_stamp is unnecessary.

Now, characteristics of the Playlist having the data structure described above are described successively.

1) The Playlist is a collection of only those portions to be reproduced of a "material" called Clip each with an IN point (start point) and an OUT point (end point).

2) The Playlist is a unit which is recognized as one unity by a user similarly to the Clip.

3) The Playlist is also a structure for realizing nondestructive assemble editing. The Clip and the Playlist have a Master-Slave relationship, and even if a Playlist is produced, divided, merged or erased, the Clip is not changed thereby.

4) A portion of the Clip which is designated is called Playitem. A Playlist is composed of an array of Playitems.

5) The Playitem is principally composed of a file id or a file name for specifying an AV stream file, a program_number prescribed for an MPEG2 transport stream and an IN point and an OUT point on a program corresponding to the program_number. In the Clip, for each program, a local time base is defined for each section within which the PCR is continuous, and the IN point and the OUT point can each be represented using a pts.

Figure 11:
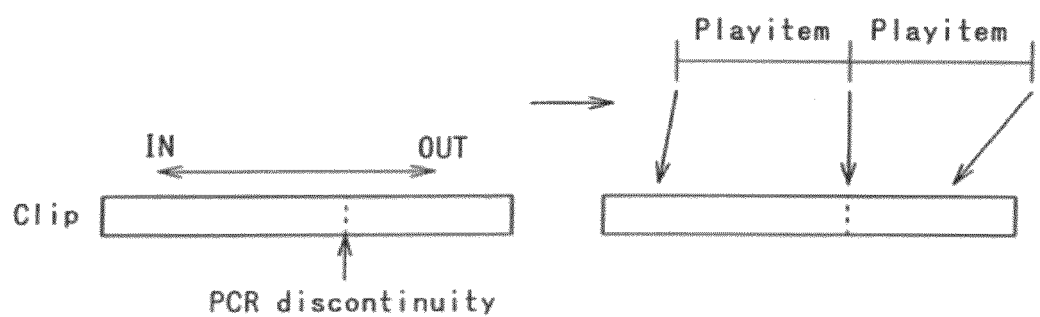
FIG. 11 is a diagrammatic view illustrating division of a Playitem at a discontinuity point of a PCR.

6) A reproduction designation range of Playitems which form a Playlist is closed within a PCR continuous section of the Clip as seen in FIG. 11.

7) One Playitem cannot be shared by two or more Playlists.

8) Only one Playitem is produced from a Clip which forms a bridge sequence. The Clip which forms a bridge sequence is not shared between a plurality of Playitems.

Figure 12:
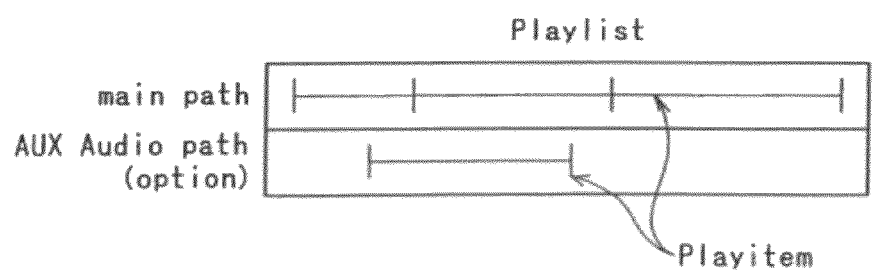
FIG. 12 is a diagrammatic view illustrating that the Playlist is constructed from a main path and an AUX audio path.

9) The Playlist allows post-recording. An object of such post-recording is maintained in a nondestructive state. As a path for post-recording, one AUX Audio path is provided in the Playlist as seen in FIG. 12. An array of video and audio Playitems which are outputted as a main output is called main path.

10) Reproduction times of a plurality of Playitems do not overlap with each other in time on a single path. Where two or more Playitems are arranged on one main path, the Playitems are arranged closely to each other and no gap must be present between the reproduction times.

11) The reproduction type of the Playlist is the same as the reproduction time of the main path.

12) The number of Playitems which are present on the AUX Audio path is 0 or 1.

13) The range between the reproduction start time and the reproduction end time of the AUX Audio path must not exceed the range between the reproduction start time and the reproduction end time of the main path.

Subsequently, operations upon nondestructive editing of a Playlist are described.

1) Production of a Playlist

When an AV stream is recorded newly, a Clip composed of an AV stream file and AV stream file information, and a Playitem which refers to the Clip is produced and then a Playlist is produced.

2) Erasure

When a reproduction order destination which has become unnecessary is to be erased, it is erased over all of the Playlists or in a unit of a Playitem.

3) Division

Figure 13:
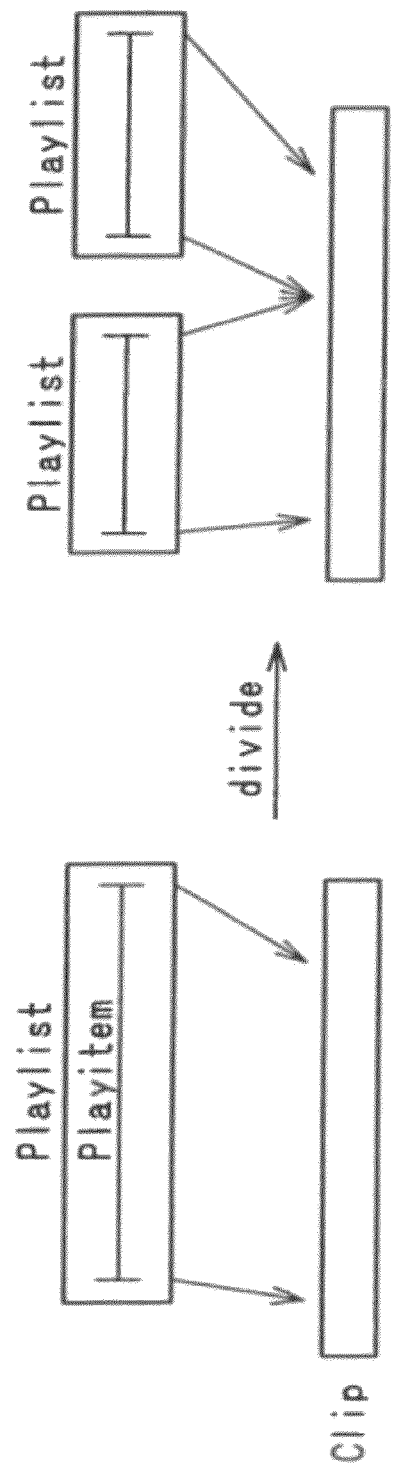
FIG. 13 is a diagrammatic view illustrating division of the Playlist.

As seen in FIG. 13, a Playitem which forms one Playlist is divided into Playitems, and a Playlist is formed for each of the Playitems obtained by the division.

4) Merge (Non-Seamless or Seamless Connection)

Figures 14A, 14B:
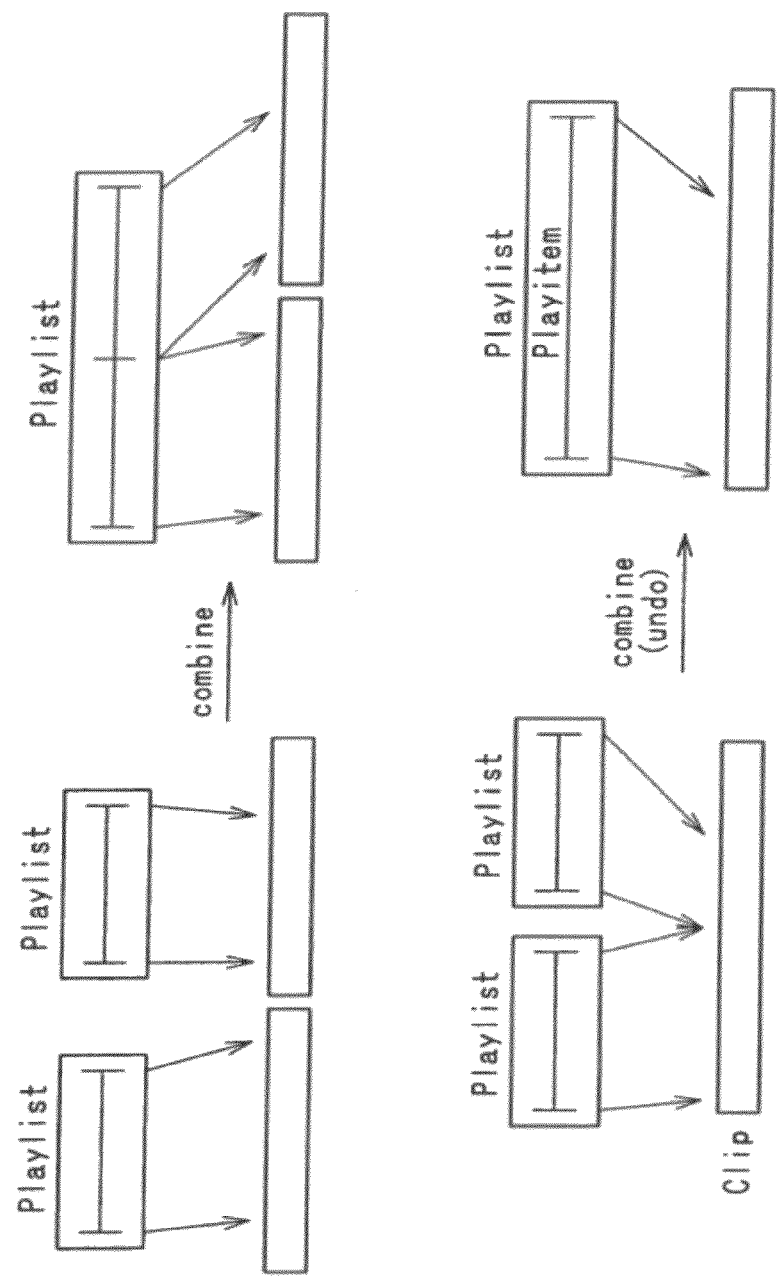
FIGS. 14A and 14B are diagrammatic views illustrating different manners of combination of Playlists.

Two Playlists are connected to form a single Playlist. Merge processing is different, at the connection point, depending upon whether the Playlists are merged such that they may be reproduced in such a seamless manner that an image and sound are not interrupted or the Playlists are merged such that they may be reproduced in a non-seamless manner that occurrence of interruption is allowed. When the two Playlists are merged so as to allow non-seamless reproduction, a new AV stream need not be produced, but the Playitems of the two Playlists are arranged in a row in a reproduction order to form one Playlist as seen in FIG. 14A. It is to be noted that, where the Playlists which compose the two Playlists to be merged refer to the same Clip and the portions to be referred to are continuous to each other as seen in FIG. 14B, also the Playitems are merged. FIG. 15 indicates an example wherein a bridge sequence (details are hereinafter described) for connecting the two Playlists so as to allow seamless reproduction is produced.

5) Movement

As seen in FIG. 16, an array of Playlists in the Playlist block which defines a reproduction order of the Playlists is changed. Each Playlist is not changed.

6) Clip Conversion

It is assumed that, for example, a material imaged by means of a video camera is converted into a Clip and a Playlist for reproduction of part of the Clip is produced. After a Playlists is completed, when it is desired to newly make another Clip with which reproduction is performed in the reproduction order of the same and the entity of the stream is involved, portions designated by the Playlist are copied to produce a new Clip as seen in FIG. 17 (the original Clip is converted into the new Clip).

7) Minimization of a Clip

As seen in FIG. 18, any portion of a Clip which is not designated for reproduction by any Playlist (or Playitem which forms a Playlist) is erased.

8) Erasure of a Clip

A Clip which is not designated for reproduction by any Playlist (or Playitem which forms a Playlist) is erased.

Minimization of a Clip and erasure of a Clip are operations for erasing unnecessary data to increase the free capacity of the disk.

Subsequently, seamless reproduction between Playitems which form a Playlist is described. In order to realize seamless reproduction between Playitems, the state of a connection point of each Playitem must be classified. Here, the state of a connection point of a Playitem is classified into one of four types including an A type, a C type, a D type and an E type as seen in FIG. 19.

The A type denotes a state wherein the IN point (start point) and the OUT point (end point) of a Playitem designate an arbitrary picture of an AV stream. Where images are coded in accordance with the MPEG video system, a designated picture is not limited to an I picture but may be a P picture or a B picture. Therefore, for example, where the designated picture is a P picture or a B picture, in order to display the picture designated with the IN point, data of a picture preceding to the IN point are required. Since the information that a Playitem has is a pts of the IN point, the position of a preceding picture from which data are to be read is determined arbitrarily by the reproduction side. Consequently, if the reading start position is preceding by an excessively great distance, then unnecessary data for reproduction of the P picture or the B picture may be read in. Similarly, in order to display a picture at the OUT point, data of a picture necessary for decoding must be read in although they are not displayed. In such an instance, after decoding of the picture at the OUT point is completed, it is necessary to flash (or erase the data) of the frame buffer of the decoder before data of the next Playitem are decoded. Further, since unnecessary data later than the OUT point may remain stored in the buffer of the decoder, also the decoder buffer must be flashed.

After all, when a connection face of the A type is to be reproduced, it is necessary to interrupt ordinary reproduction processing such as continuous decoding and continuous displaying and perform such processing of reading in data which are not displayed as described above. Therefore, there is the possibility that the boundary between playitems may become non-seamless.

The C type denotes a state wherein the connection point is a clean break. The clean break is a condition wherein such tail processing as to remove data unnecessary for decoding has been performed. This connection point is produced by demultiplexing and decoding data around the connection point and then re-encoding and re-multiplexing the demultiplexed decoded data. Accordingly, different from the A type, the C type does not require data of a picture preceding to a picture at the connection point or data of a picture following the picture at the connection point. In order to make the condition of a connection point the C type, for example, it is only required to re-encode a picture corresponding to the IN point so that it may be the top of a GOP (Group Of Pictures) and re-encode a picture corresponding to the OUT point so that it may be the last picture of the GOP. It is to be noted, however, that the PCR is discontinuous at the connection point of the C type.

The D type is a type of a connection point for allowing jumping from or to an intermediate portion of an AV stream file and denotes a condition wherein it is continuous to preceding and following Playitems in the accuracy of a byte. Accordingly, if data are read out from the AV stream file in accordance with the arranged order of the Playitems, then a continuous bit stream is obtained although an exchange of a file is involved, and continuous decoding is possible. A connection point of the D type appears when the reproduction point goes out from an intermediate portion of a file and enters a bridge sequence or when the reproduction point goes out of a bridge sequence and enters an intermediate portion of a file.

The E type denotes a state wherein the Playitem is the top or the last of an AV stream file and, at the position, the bit stream is continuous to the preceding or following Playitem in the accuracy of a byte. The E type and the D type are different from each other in whether or not a picture designated by a Playitem is placed just at the top or last position of a file. The E type appears when a bridge sequence or a continuous stream is divided into two files.

Figure 20A:
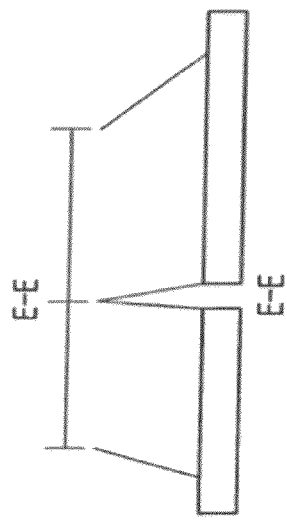
FIGS. 20A to 20D are diagrammatic views showing an example of different types of connection points between Playitems.

FIG. 20A illustrates an example wherein two AV streams are partly designated each with an IN point and an OUT point to produce Playitems, and the Playitems are arranged to form a Playlist. In this instance, since no special processing is performed for the AV streams but the Playitems are merely arranged, both of the connection points of the two Playitems become those of the A type. Accordingly, there is the possibility that discontinuity such as interruption of an image may occur between the two Playitems, and seamless reproduction is not assured.

Figure 20C:
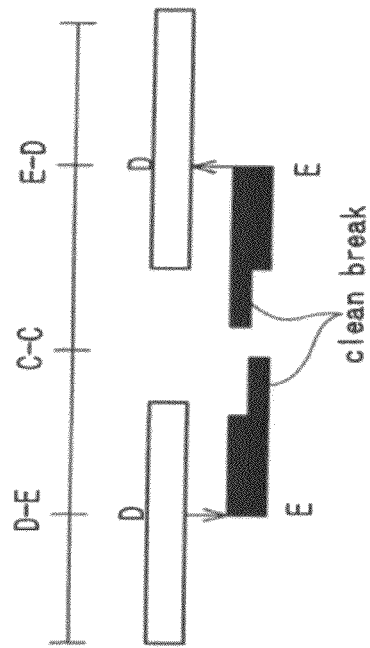
Figure 20B:
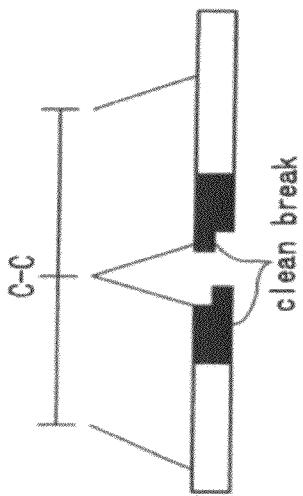

FIG. 20B illustrates an example wherein two connection points are of the C type. In this instance, seamless reproduction is assured even across the two Playitems.

FIG. 20C illustrates an example wherein an originally one AV stream file is divided into two files and the two files are connected by Playitems. Playitems which connect divided AV stream files in this manner have connection points of the E type. Accordingly, if data are read in continuously at the boundary between the AV stream files, then a continuous bit stream is obtained without execution of special processing. Consequently, seamless reproduction is assured.

Figure 20D:
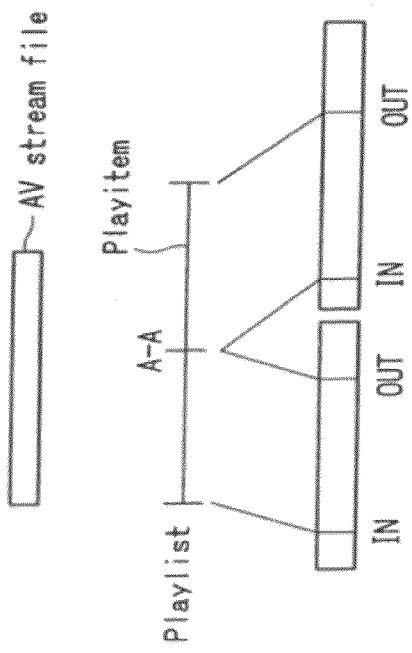

FIG. 20D illustrates an example wherein a bridge sequence is produced to allow seamless reproduction of two Playitems. The bridge sequence is a method for realizing seamless reproduction without modifying an original AV stream file. The example of FIG. 20D is different from the example of FIG. 20B in that an original AV stream file is not modified. Here, the point at which the reproduction point goes out from intermediately of the AV stream file in order to enter the bridge sequence and the point at which the reproduction point goes out of the bridge sequence and enters an intermediate point of the AV stream file are of the D type.

Subsequently, a bridge sequence which is a structure for allowing seamless reproduction between two Playitems having connection points of the D type. The bridge sequence is a short AV stream produced by copying or partly re-encoding an AV stream around a connection point in a free area on a disk. Upon reproduction, the short AV stream as the bridge sequence is reproduced to realize seamless reproduction. The bridge sequence may be formed from two AV stream files across a clean break as seen in FIG. 21A or from a single AV stream file as seen from FIG. 21B.

The clean break is used in a case wherein two Clips are reproduced seamlessly or in another case wherein two Playitems are reproduced seamlessly. When two Clips are reproduced seamlessly, if re-encoding and re-multiplexing are performed, then the ends of the AV stream files seamlessly connected to each other make such a clean break as seen in FIG. 22A. Usually, data in elementary streams to be displayed at the same timing are positioned in a spaced relationship from each other in a file due to a multiplexing phase difference in the MPEG2 systems. The clean break is a condition wherein an elementary stream to be displayed before a certain timing and another elementary stream to be displayed after the certain timing are separated in separate files from each other taking the multiplexing phase difference into consideration. Naturally, also audio data to be reproduced at the same timing as the timing at which video data present in the preceding side file are displayed are included in the preceding side file, and similarly, also audio data to be reproduced at the same timing as the timing at which video data present in the following side file are present in the following side file.

The bridge sequence is formed, where, for example, two Playitems are to be seamlessly reproduced, as an AV stream file independent of the original AV stream file as seen in FIG. 22B. The bridge sequence is produced as a new file by copying a bit stream around a connection point (the original AV stream file), and only the portion is re-made by decoding and re-encoding.

Now, requirements 1-1 to 4-1 upon production of a bridge sequence are described. From the necessity for the assurance of continuous supply and the continuity of read out data, points a, d, e and h (FIGS. 21A and 21B) on the bridge sequence must be byte positions which satisfy the following requirements.

The bridge sequence production requirements where attention is paid to a relationship between a fragment and a segment are described. Here, a segment denotes a portion of a fragment which is occupied by data.

1-1) As seen in FIG. 23, bridge sequences S2 and S3 and segments S1 and S4 complementary to the bridge sequences must have a size greater than 0.5 fragment.

The bridge sequence production requirement 2-1 is described.

Figure 24:
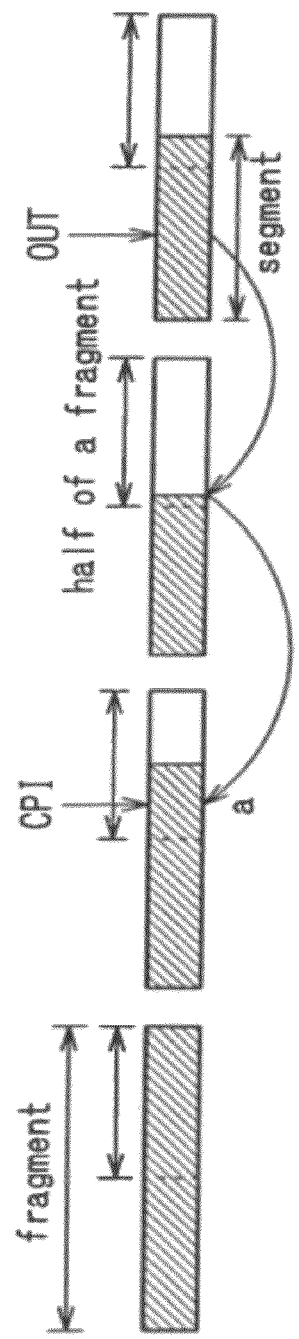

2-1) As seen in FIG. 24, the position of the point a is determined based on an OUT point designated by a user.

More particularly, the top of a source packet in which CPI is present in a rear half portion of a fragment (half of fragment) is determined as a candidate to the point a. If the point a cannot be found out in the object fragment, then the object fragment is changed to the preceding fragment, and a point which satisfies the requirement is searched for in the fragment. A source packet is a transport packet with time information of 4 bytes added thereto. The object fragment is changed retroactively one by one fragment until the point a is found out. The portion from the point a to the OUT point designated by the user is either copied as it is or re-encoded and placed into the bridge sequence. Whether a point indicated by the CPI is included in the latter half of a fragment and the number of CPIs included rely upon the bit rate. More detailed processing is hereinafter described with reference to a flowchart of FIG. 29.

Bridge sequence production requirements where attention is paid to a relationship between an aligned unit and CPI are described with reference to FIGS. 25A and 25B. It is to be noted that the aligned unit is a unit used when an AV stream is placed into a file, and is a structure for handling a predetermined number of successive sectors on a file system as one unit. The top of an aligned unit is aligned with a source packet, and consequently, an aligned unit begins with the top of a source packet without failure. An AV stream file is formed from an integral multiple of an aligned unit.

The CPI denotes a position which can be randomly accessed in an AV stream (a position at which decoding can be started), and makes a database of a pts (presentation time stamp) of a picture in the AV stream and an intra-file byte position of the picture. If the CPI database is referred to, then time stamps which define the IN point and the OUT point of a Playitem can be converted into a byte position of the Playitem in the AV stream file. On the contrary, if there is no CPI database, then since conversion from a display time into an intra-file byte position is difficult, a connection point to a bridge sequence must be adjusted to the position designated by the CPI.

Bridge sequence production requirements 3-1 to 3-7 where attention is paid to an aligned unit and CPI having such characteristics as described above are listed below.

3-1) The point b (FIG. 25A) of the bridge sequence is aligned with the aligned unit because it is the top of the file.

3-2) The point b is also the top of a source packet.

3-3) Where the range from the point b to the point d is defined as a file, the length thereof must be equal to an integral number of times that of the aligned unit.

3-4) While the point a is designated by the pts, in order to discriminate the byte position, the CPI is referred to. Accordingly, the point a must be a point designated by the CPI (precisely, upon reproduction, the reproduction point goes out at a byte immediately preceding to a source packet designated by the point a).

3-5) The range from the point a to the point b is continuous in the accuracy of a byte (D type-E type connection). Accordingly, also the point b is a point designated by the CPI.

3-6) Since the point d is designated by the pts, the point e must be a point designated by the CPI.

3-7) Since the points b and e are points designated by the CPI, each of them must be the top of a source packet. The points a and e may not be aligned with an aligned unit.

Figure 26A:
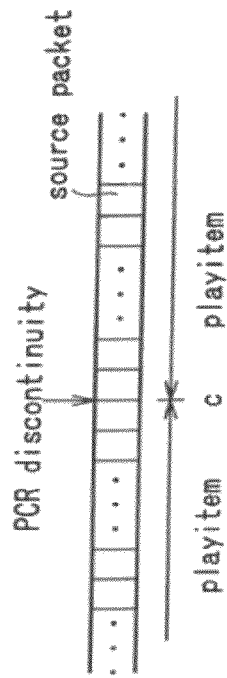
Figure 26B:
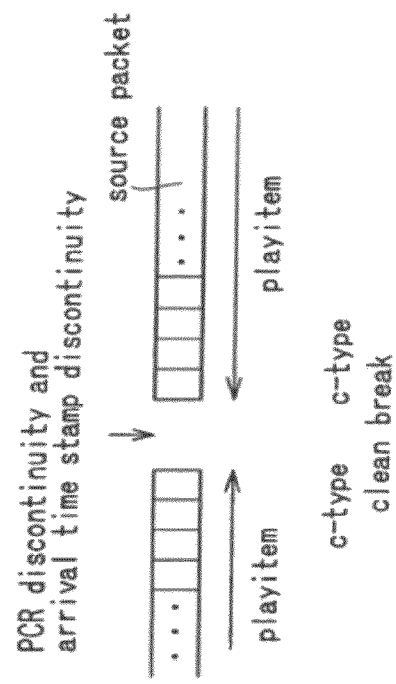

Subsequently, requirements of a Playitem which designates a bridge sequence is described with reference to FIGS. 26A and 26B. As seen in FIGS. 21A and 21B, a bridge sequence can be obtained by two different methods including a method wherein it is formed as two AV streams divided with a clean break and another method wherein it is formed as a single AV stream. Whichever one of the two methods is used, the number of Playitems which designate the bridge sequence is two. This is because, even if the bridge sequence is formed as a single AV stream, it includes a PCR discontinuity point, at which it is divided into two Playitems. This is intended to facilitate time management with the playitems and, since there is the possibility that a PCR discontinuity point may appear only at a boundary of a Playitem, to eliminate the necessity to take a discontinuity point into consideration during reproduction of a Playitem by providing the restriction that a PCR discontinuity point does not appear within a Playitem.

According to the syntax of the block Playitem( ) shown in FIG. 10, a set of an IN point and an OUT point that a Playitem has must be within a section having a continuous PCR designated by the same sequence_id. From the foregoing, the bridge sequence production requirement 4-1 around a PCR discontinuity point is such as follows.

4-1) Since a playitem can be designated within a range having a continuous PCR, the playitem is divided at a PCR discontinuity point C.

A Playlist which can be seamlessly reproduced can be produced in accordance with such bridge sequence production requirements 1-1 to 4-1 as described above.

Figure 27:
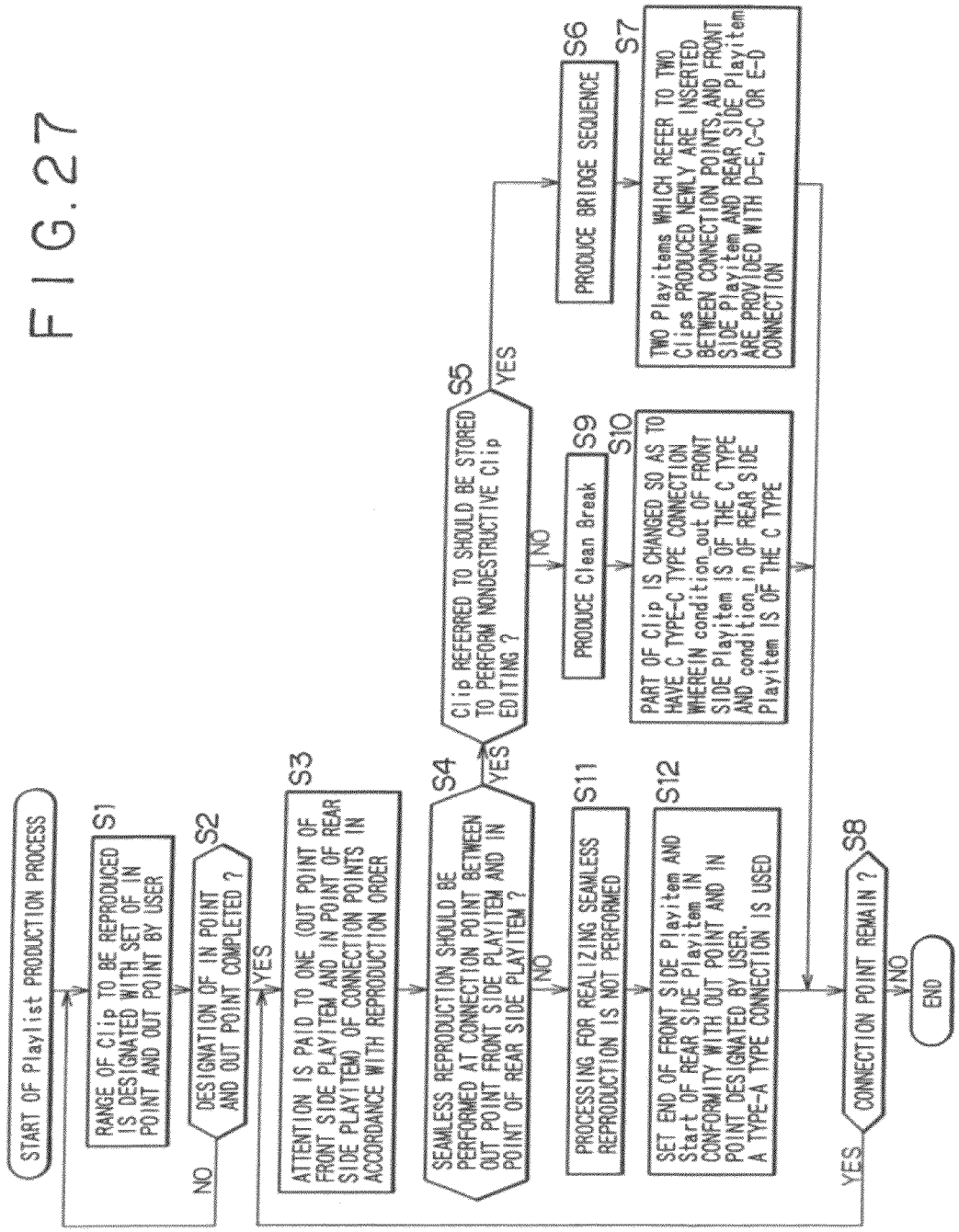
FIG. 27 is a flowchart illustrating a Playlist production process.

Subsequently, a setting process for conditions of connection points (condition_IN and condition_OUT) of a Playitem upon production of a Playlist is described with reference to a flowchart of FIG. 27.

In step S1, an input of a range in a Clip to be reproduced is accepted. In particular, a user will input an IN point and an OUT point to designate a range to be reproduced. In step S2, it is discriminated whether or not the inputting of an IN point and an OUT point is completed, and such inputting of an IN point and an OUT point by the user is accepted until the inputting of an IN point and an OUT point comes to an end. If it is discriminated that the inputting of an IN point and an OUT point comes to an end, then the processing advances to step S3.

In step S3, attention is paid to one of connection points in accordance with the order of reproduction. In step S4, it is discriminated whether or not processing for allowing seamless reproduction to be performed at the connection point should be performed. If it is discriminated that processing for allowing seamless reproduction to be performed should be performed, then the processing advances to step S5.

In step S5, it is discriminated whether or not the following processing should be executed without destroying the Clip to be referred to. If it is discriminated that the following processing should be executed without destroying the Clip to be referred to, then the processing advance to step S6, in which a bridge sequence is produced. In step S7, two Playitems which refer to the two Clips newly produced are inserted between the connection points. The two Playitems have a D type-E type connection wherein the Condition_out of the front side Playitem is of the D type and the Condition_IN of the rear side Playitem is of the E type, or a C type-C type connection wherein the Condition_out of the front side Playitem is of the C type and the Condition_IN of the rear side Playitem is of the C type, or else an E type-D type connection wherein the Condition_out of the front side Playitem is of the E type and the Condition_IN of the rear side Playitem is of the D type.

In step S8, it is discriminated whether or not the Playlists still have a connection point which has not been processed as yet. If it is discriminated that a connection point which has not been processed as yet remains, the processing returns to step S3 so that the processing in step S3 et seq. is repeated.

It is to be noted that, if it is discriminated in step S5 that the succeeding processing should be executed while the Clip to be referred to is destroyed, then the processing advances to step S9, in which a clean break is produced. In step S10, part of the Clip is changed so as to have a C type-C type connection wherein the Condition_out of the front side Playitem is of the C type and the Condition_IN of the rear side Playitem is of the C type.

On the other hand, if it is discriminated in step S4 that processing for allowing seamless reproduction to be performed should not be performed, then the processing advances to step S11. In step S11, it is determined that processing for realizing seamless reproduction is not performed. Then in step S12, the Playitems are changed so as to have an A type-A type connection wherein the Condition_out of the front side Playitem is of the A type and the Condition_IN of the rear side Playitem is of the A type.

Figure 28:
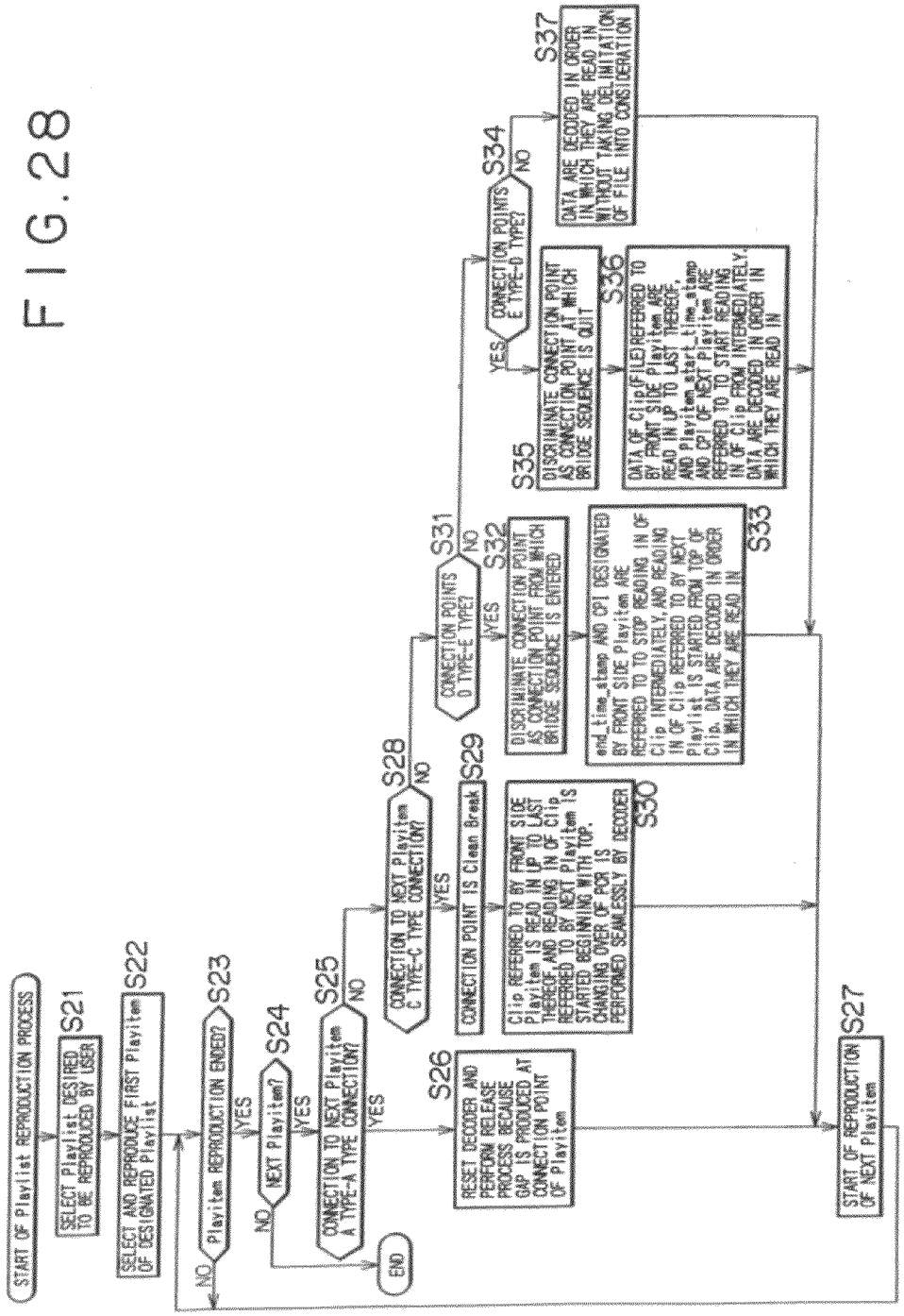
FIG. 28 is a flowchart illustrating a Playlist reproduction process.

Subsequently, a reproduction process based on a Playlist is described with reference to a flowchart of FIG. 28. In step S21, one of existing Playlists is selected. In step S22, the top one of Playitems which form the Playlist selected in step S21 is selected, and reproduction of the Clip based on the selected Playitem is started. In step S23, it is discriminated whether or not the reproduction of the Clip based on the selected Playitem comes to an end, and it is waited that it is discriminated that the reproduction of the Clip based on the Playitem comes to an end. If it is discriminated that the reproduction of the Clip based on the Playitem comes to an end, then the processing advances to step S24.

In step S24, it is discriminated whether or not there is a next Playitem which follows the current Playitem. If it is discriminated that there is no next Playitem, then the present Playlist reproduction process is ended. However, if it is discriminated that there is a next Playitem, then the processing advances to step S25.

In step S25, it is discriminated whether or not the connection point to the next Playitem has an A type-A type connection. If it is discriminated that the connection point to the next Playitem has an A type-A type connection, then since a gap appears at the connection point of the Playitem, the processing advances to step S26, in which the decoder is reset and a release process is executed. In step S27, reproduction of the Clip is started based on the next Playitem. Thereafter, the processing returns to step S23 so that the processing in step S23 et seq. is repeated.

It is to be noted that, if it is discriminated in step S25 that the connection point to the next Playitem does not have an A type-A type connection, then the processing advances to step S28. In step S28, it is discriminated whether or not the connection point to the next Playitem has a C type-C type connection. If it is discriminated that the connection point to the next Playitem has a C type-C type connection, then it is discriminated in step S29 that the connection point is reproduced with a clean break. In step S30, the data of the Clip referred to by the front side Playitem are read in up to the last data thereof, and then reading in of the Clip beginning with the top data which is referred to by the next Playitem is started. Changing over of a PCR is performed seamlessly by the decoder. Then, the sequence advances to step S27.

If it is discriminated in step S28 that the connection point to the next Playitem does not have a C type-C type connection, then the processing advances to step S31. In step S31, it is discriminated whether or not the connection point to the next Playitem has a D type-E type connection. If it is discriminated that the connection point to the next Playitem has a D type-E type connection, then the processing advances to step S32, in which it is determined that the connection point is a connection point with which the bridge sequence is entered. In step S33, the Playitem_end_time_stamp and the CPI designated by the front side Playitem are referred to and the reading in is stopped intermediately of the Clip, and reading in of the Clip referred to by the next Playitem is started beginning with the top data of the Clip. The data read in are decoded in the order in which they are read in. Then, the processing advances to step S27.

If it is discriminated in step S31 that the connection point to the next Playitem does not have a D type-E type connection, then the processing advances to step S34. In step S34, it is discriminated whether or not the connection point to the next Playitem has an E type-D type connection. If it is discriminated that the connection point to the next Playitem has an E type-D type connection, then the processing advances to step S35, in which it is discriminated that the connection point is a connection point at which the reproduction point goes out of the bridge sequence. In step S36, the data of the Clip referred to by the front side Playitem are read in up to the last data thereof, and then the Playitem_start_time_stamp and the CPI are referred to and reading in of the Clip is started beginning with the intermediate portion of the same. The data read in are decoded in the order in which they are read in. Then, the processing advances to step S27.

If it is discriminated in step S34 that the connection point to the next Playitem does not have an E type-D type connection, then the processing advances to step S37. In step S37, it is discriminated that the connection point has an E type-E type connection. The data are read in without taking a delimitation of a file into consideration, and if the data are decoded in the order in which they are read in, then they are reproduced seamlessly. Then, the processing advances to step S27.

Figure 29:
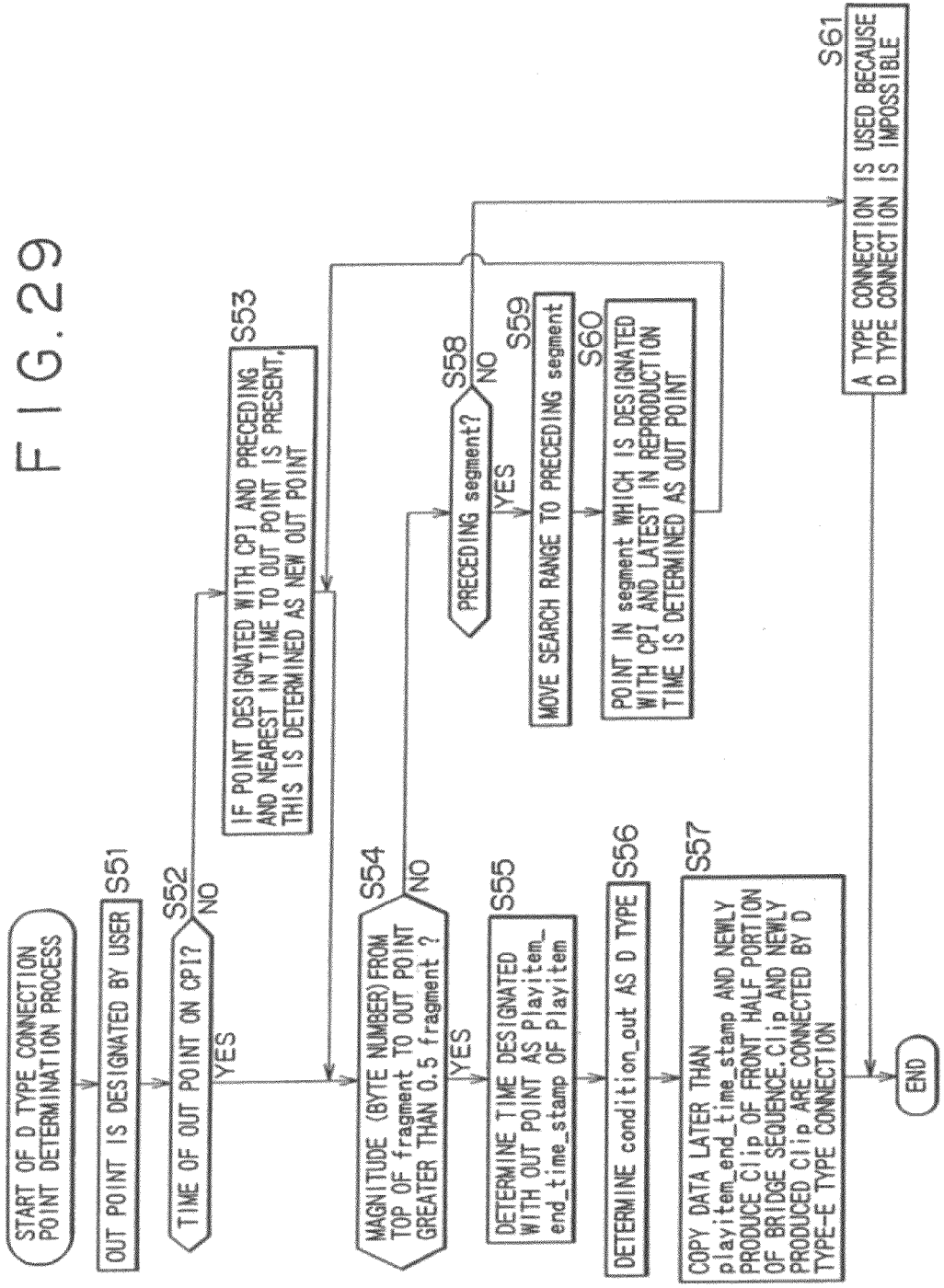
FIG. 29 is a flowchart illustrating a process when a connection point is determined as that of a D type.

Now, a detailed process of the bridge sequence production requirement 2-1 "to determine the position of the point a based on the OUT point designated by a user" is described with reference to a flowchart of FIG. 29.

In step S51, an OUT point from a Clip is designated. In step S52, it is discriminated whether or not the timing of the OUT point is on the CPI. If the reproduction timing of the OUT point is not on the CPI, then the processing advances to step S53. In step S53, if a point or points which are each indicated by the CPI corresponding to a timing preceding to the timing of the OUT point are present, then the nearest one of the points is determined as a new OUT point. It is to be noted that, if it is discriminated in step S52 that the reproduction timing of the OUT point is on the CPI, then the processing in step S53 is skipped.

In step S54, it is discriminated whether or not the magnitude (byte number) from the top of the fragment to the OUT point is greater than one half the fragment. If it is discriminated that the magnitude from the top of the fragment to the OUT point is greater than one half the fragment, then the processing advances to step S55.

In step S55, the timing designated with the OUT point is determined as the Playitem_end_time_stamp of the Playitem. In step S56, the condition_out of the Playitem is determined as the D type. In step S57, data following the Playitem_end_time_stamp are copied and a Clip of the front half of a bridge sequence is produced newly. The Clip and the newly produced Clip are connected to each other by a D type-E type connection.

If it is discriminated in step S54 that the magnitude from the top of the fragment to the OUT point is not greater than one half the fragment, then the processing advances to step S58. In step S58, it is discriminated whether or not the preceding segment is present. If it is discriminated that the preceding segment is present, then the processing advances to step S59. In step S59, the search range is changed to the preceding segment. In step S60, a point which is present in the preceding segment and is the latest point in reproduction timing represented by the CPI is determined as the OUT point. Then, the processing returns to step S54.

It is to be noted that, if it is discriminated in step S58 that the preceding segment is not present, then the processing advances to step S61, in which it is discriminated that it is impossible to determine the condition_out of the Playitem as the D type, and the condition_out is determined as the A type.

As described above, according to the present invention, by providing a file Playlist, which is a file independent of an AV stream file and has only a link structure indicating an AV stream, with information indicative of a state of a connection point between Playitems, augmentation of the reproduction quantity is allowed.

It is to be noted that, while, in the present embodiment, the medium onto which an AV stream file and so forth are to be recorded is an optical disk, any other medium may be used only if it allows random accessing.

By the way, while the series of processes described above can be executed by hardware, it may otherwise be executed by software. Where the series of processes is executed by software, a program which constructs the software is installed from a recording medium into a computer incorporated in hardware for exclusive use or, for example, a personal computer for universal use which can execute various functions by installing various programs.

The recording medium is distributed in order to provide the program to a user separately from a computer. The recording medium is not only formed as a package medium such as a magnetic disk (including a floppy disk), an optical disk (including a CD-ROM (Compact Disc-Read Only Memory) and a DVD (Digital Versatile Disc)), a magneto-optical disk (including an MD (Mini Disc)) or a semiconductor memory or but also formed as a ROM (which corresponds to the ROM 22 of FIG. 1), a hard disk or the like in or on which the program is recorded and which is provided in a state wherein the program is incorporated in a computer in advance to a user.

It is to be noted that, in the present application, the steps which describe the program recorded on a recording medium may be but need not necessarily be processed in a time series in the order as described, and include processes which are executed parallelly or individually.

While a preferred embodiment of the present invention has been described using specific terms, such description is for illustrative purposes only, and it is to be understood that changes and variations may be made without departing from the spirit or scope of the following claims.

The invention claimed is:

1. A recording apparatus, comprising:
a recording device configured to record data onto a recording medium, the recording medium comprising:
recorded AV data including a plurality of pictures divided into a plurality of clips and a plurality of PlayItems representative of a reproduction range corresponding to said plurality of clips;
wherein a specific PlayItem includes connection information representative of a connection condition at least from a previous PlayItem to the specific PlayItem, and said connection information indicates an assured seamless play or a not assured seamless play,
wherein said connection information depends on whether or not a reproducing apparatus needs to process data prior to the specific PlayItem that is not displayed to display a picture at the connection point by the specific PlayItem; and
wherein said AV data can be accessed in accordance with said reproduction range information and said connection information, and a picture at a connection point indicated by the specific PlayItem can be decoded after a picture indicated by the previous PlayItem has been decoded, without processing the data that is not displayed if the connection information indicates the assured seamless play.

2. The recording medium according to claim 1, wherein said reproduction range information comprises a PlayList and a PlayItem.

3. A recording apparatus, comprising:
a recording device configured to record data onto a recording medium, the recording medium comprising:
AV data;
a plurality of play items, each play item indicating a start time and an end time of a portion of the AV data; and
at least one play list including one or more of said play items;
wherein each play item includes connection information indicating whether a connection condition between said play item and the play item to be reproduced just before said play item is certified as assuring a seamless connection;
wherein said AV data include a plurality of packets;

wherein said connection condition is based on a discontinuity of a program clock reference and/or an arrival time stamp stored in said packets; and wherein a picture can be decoded at a connection point after a previous presentation picture has been decoded, without processing any unnecessary data if the connection information indicates the assured seamless play.

4. A recording method for recording data on a recording medium, the recording method comprising:

recording, by a recording device, onto the recording medium, AV data including a plurality of pictures divided into a plurality of clips and a plurality of PlayItems representative of a reproduction range corresponding to said plurality of clips;

wherein a specific PlayItem includes connection information representative of a connection condition at least from a previous PlayItem to the specific PlayItem and said connection information indicates an assured seamless play or a not assured seamless play;

wherein said connection information depends on whether or not a reproducing apparatus needs to process data prior to the specific PlayItem that is not displayed to display a picture at the connection point by the specific PlayItem; and wherein the AV data can be accessed in accordance with said reproduction range information and said connection information, and a picture at a connection point indicated by the specific PlayItem can be decoded after a picture indicated by the previous PlayItem has been decoded, without processing the data that is not displayed if the connection information indicates the assured seamless play.

5. The recording method according to claim 4, wherein said reproduction range information comprises a PlayList and a PlayItem.

6. A recording method for recording data onto a recording medium, the recording method comprising:

recording, by a recording device, AV data onto the recording medium;

recording, by the recording device, a plurality of play items onto the recording medium, each play item indicating a start time and an end time of a portion of the AV data; and recording, by the recording device, at least one play list including one or more of said play items onto the recording medium;

wherein each play item includes connection information indicating whether a connection condition between said play item and the play item to be reproduced just before said play item is certified as assuring a seamless connection;

wherein said AV data include a plurality of packets;

wherein said connection condition is based on a discontinuity of a program clock reference and/or an arrival time stamp stored in said packets; and wherein a picture can be decoded at a connection point indicated after a previous presentation picture has been decoded, without processing any unnecessary data if the connection information indicates the assured seamless play.

7. A non-transitory computer readable medium including computer executable instructions to control a computer to record data onto a recording medium, comprising:

first computer executable instructions to control a recording device to record, onto the recording medium, AV data including a plurality of pictures divided into a plurality of clips and a plurality of PlayItems representative of a reproduction range corresponding to said plurality of clips;

wherein a specific PlayItem includes connection information representative of a connection condition at least from a previous PlayItem to the specific PlayItem, and said connection information indicates an assured seamless play or a not assured seamless play, wherein said connection information depends on whether or not a reproducing apparatus needs to process data prior to the specific PlayItem that is not displayed to display a picture at the connection point by the specific PlayItem; and wherein said AV data can be accessed in accordance with said reproduction range information and said connection information, and a picture at a connection point indicated by the specific PlayItem can be decoded after a picture indicated by the previous PlayItem has been decoded, without processing the data that is not displayed if the connection information indicates the assured seamless play.

8. The computer readable medium according to claim 7, wherein said reproduction range information comprises a PlayList and a PlayItem.

9. A non-transitory computer readable medium including computer executable instructions to control a computer to record data onto a recording medium, comprising:

first computer executable instructions to control a recording device to record, onto the recording medium, AV data;

second computer executable instructions to control a recording device to record, onto the recording medium, a plurality of play items, each play item indicating a start time and an end time of a portion of the AV data; and third computer executable instructions to control a recording device to record, onto the recording medium, at least one play list including one or more of said play items;

wherein each play item includes connection information indicating whether a connection condition between said play item and the play item to be reproduced just before said play item is certified as assuring a seamless connection;

wherein said AV data include a plurality of packets;

wherein said connection condition is based on a discontinuity of a program clock reference and/or an arrival time stamp stored in said packets; and wherein a picture can be decoded at a connection point after a previous presentation picture has been decoded, without processing any unnecessary data if the connection information indicates the assured seamless play.

* * * * *